US011341506B2

(12) United States Patent
Mora

(10) Patent No.: US 11,341,506 B2
(45) Date of Patent: May 24, 2022

(54) AUTOMATED SOCIAL MEDIA QUEUING SYSTEM

(71) Applicant: ACF Technologies, Inc., Asheville, NC (US)

(72) Inventor: Jose Gregorio Mora, Miami, FL (US)

(73) Assignee: ACF Technologies, Inc., Asheville, NC (US)

( * ) Notice: Subject to any disclaimer, the term of this patent is extended or adjusted under 35 U.S.C. 154(b) by 955 days.

(21) Appl. No.: 15/664,815

(22) Filed: Jul. 31, 2017

(65) Prior Publication Data

US 2018/0033019 A1    Feb. 1, 2018

Related U.S. Application Data

(60) Provisional application No. 62/510,316, filed on May 24, 2017, provisional application No. 62/420,102, (Continued)

(51) Int. Cl.
*G06Q 30/00* (2012.01)
*G06Q 50/00* (2012.01)
(Continued)

(52) U.S. Cl.
CPC ... *G06Q 30/016* (2013.01); *G06Q 10/063114* (2013.01); *G06Q 50/01* (2013.01); *H04L 51/32* (2013.01); *G06F 16/285* (2019.01)

(58) Field of Classification Search
CPC combination set(s) only.
See application file for complete search history.

(56) References Cited

U.S. PATENT DOCUMENTS 6,059,184 A    5/2000  Ahlstrom et al.
6,771,766 B1   8/2004  Shafiee et al.
(Continued)

FOREIGN PATENT DOCUMENTS

EP    1247226 A1    10/2002
NO    322430 B1     10/2006
(Continued)

OTHER PUBLICATIONS

Acharya, A, Manweiler, J, Sharma, S, Banerjee, N, "Presence Based Open Contact Center Leveraging Social Networks", online, 2013 IFIP/IEEE International Symposium on Integrated Network Management, pp. 1-14 [retieved on Jan. 5, 2022], Reterived from the internet: https://ieeexplore.ieee.org/document/6 (Year: 2013).*
(Continued)

*Primary Examiner* — Lynda Jasmin
*Assistant Examiner* — Ehrin L Pratt
(74) *Attorney, Agent, or Firm* — Nelson Mullins Riley & Scarborough LLP

(57) ABSTRACT

An automated queue is provided including processing circuitry configured to receive one or more posts from a social media platform associated with a target entity, generate a case including the content of a post, enter the case in a virtual queue for agent review, in response to the case reaching the front of the virtual queue, causing the content to be displayed to an agent on a user interface, receive a response from the user interface, and cause the response to be posted to the social media platform.

20 Claims, 14 Drawing Sheets

Related U.S. Application Data filed on Nov. 10, 2016, provisional application No. 62/368,304, filed on Jul. 29, 2016.

(51) Int. Cl.
  *G06Q 10/06* (2012.01)
  *H04L 51/52* (2022.01)
  *G06F 16/28* (2019.01)

(56) References Cited

U.S. PATENT DOCUMENTS

| | | | |
|---|---|---|---|
| 7,046,790 B2 | 5/2006 | Holmen | |
| 7,516,148 B2 | 4/2009 | Waytena et al. | |
| 7,590,550 B2 | 9/2009 | Schoenberg | |
| 8,081,749 B1 | 12/2011 | Shaffer et al. | |
| 8,306,568 B2 | 11/2012 | Snyder | |
| 8,731,180 B2 | 5/2014 | Benefield et al. | |
| 8,788,607 B2 | 7/2014 | Lee et al. | |
| 8,831,963 B2 | 9/2014 | Backer et al. | |
| 9,009,702 B2 | 4/2015 | Tsirkin | |
| 9,065,916 B2 | 6/2015 | Oristian et al. | |
| 9,065,972 B1 | 6/2015 | Arthur et al. | |
| 9,164,789 B2 | 10/2015 | Tsirkin et al. | |
| 9,178,997 B2 | 11/2015 | Oristian et al. | |
| 9,332,044 B2 | 5/2016 | Cortes et al. | |
| 9,332,224 B2 | 5/2016 | Assem Aly Salama et al. | |
| 9,355,530 B1* | 5/2016 | Block | G06Q 20/1085 |
| 9,392,163 B2 | 7/2016 | Wu et al. | |
| 10,237,225 B1* | 3/2019 | Ande | H04L 51/046 |
| 2002/0059587 A1 | 5/2002 | Cofano et al. | |
| 2002/0114323 A1 | 8/2002 | Chowdhury et al. | |
| 2003/0035531 A1 | 2/2003 | Brown et al. | |
| 2003/0037113 A1* | 2/2003 | Petrovykh | H04L 67/04 |
| | | | 709/205 |
| 2003/0177141 A1 | 9/2003 | Sahlin | |
| 2006/0186197 A1 | 6/2006 | Rosenberg | |
| 2006/0253358 A1* | 11/2006 | Delgrosso | G07C 11/00 |
| | | | 705/35 |
| 2007/0042748 A1 | 2/2007 | Macarthur | |
| 2008/0065414 A1 | 3/2008 | Schoenberg | |
| 2008/0133283 A1 | 6/2008 | Backer et al. | |
| 2009/0047461 A1 | 2/2009 | Sporrong | |
| 2009/0276704 A1 | 11/2009 | Finn et al. | |
| 2009/0325629 A1 | 12/2009 | Snyder | |
| 2010/0117790 A1 | 5/2010 | Bayne et al. | |
| 2010/0169147 A1 | 7/2010 | McCormack et al. | |
| 2010/0198647 A1 | 8/2010 | Bowers, Jr. et al. | |
| 2010/0250612 A1 | 9/2010 | Reuveni et al. | |
| 2010/0277276 A1 | 11/2010 | Bayne et al. | |
| 2011/0178960 A1 | 7/2011 | Dever et al. | |
| 2011/0261144 A1 | 10/2011 | Benefield et al. | |
| 2012/0158597 A1 | 6/2012 | Malik | |
| 2013/0030875 A1 | 1/2013 | Lee et al. | |
| 2013/0138570 A1 | 5/2013 | Ross | |
| 2013/0151296 A1 | 6/2013 | Waytena et al. | |
| 2013/0262320 A1 | 10/2013 | Makanawala et al. | |
| 2014/0046718 A1 | 2/2014 | Schiller | |
| 2014/0052463 A1 | 2/2014 | Cashman et al. | |
| 2014/0089075 A1 | 3/2014 | Sanchis et al. | |
| 2014/0100925 A1 | 4/2014 | Popescu et al. | |
| 2014/0156290 A1 | 6/2014 | Kozicki et al. | |
| 2014/0156293 A1 | 6/2014 | Kozicki et al. | |
| 2014/0270133 A1* | 9/2014 | Conway | H04M 3/5233 |
| | | | 379/265.1 |
| 2014/0343977 A1 | 11/2014 | Macina | |
| 2014/0343995 A1 | 11/2014 | Backer et al. | |
| 2015/0032675 A1* | 1/2015 | Huehn | G06Q 50/01 |
| | | | 706/12 |
| 2015/0059002 A1 | 2/2015 | Balram et al. | |
| 2015/0081569 A1 | 3/2015 | Moore et al. | |
| 2015/0088782 A1 | 3/2015 | Zhang | |
| 2015/0142684 A1* | 5/2015 | Ng | G06Q 50/01 |
| | | | 705/319 |
| 2015/0170152 A1 | 6/2015 | Shaffer et al. | |
| 2015/0193997 A1 | 7/2015 | Butler | |
| 2015/0195407 A1 | 7/2015 | Kaufman | |
| 2015/0262188 A1* | 9/2015 | Franco | H04M 3/5158 |
| | | | 705/7.21 |
| 2015/0304227 A1 | 10/2015 | Yang et al. | |
| 2015/0304366 A1 | 10/2015 | Bader-Natal et al. | |
| 2015/0304607 A1 | 10/2015 | Bader-Natal et al. | |
| 2015/0310261 A1 | 10/2015 | Lee et al. | |
| 2015/0371303 A1 | 12/2015 | Suri et al. | |
| 2016/0012375 A1 | 1/2016 | Hanson et al. | |
| 2016/0012496 A1* | 1/2016 | Hanson | H04W 4/02 |
| | | | 705/323 |
| 2016/0078528 A1 | 3/2016 | Pradeep et al. | |
| 2016/0132847 A1 | 5/2016 | Sarris | |
| 2017/0149722 A1* | 5/2017 | Fernandez Acuna | H04L 67/22 |
| 2017/0161670 A1 | 6/2017 | Ng et al. | |
| 2017/0270399 A1 | 9/2017 | Ross | |
| 2018/0032939 A1 | 2/2018 | Balakrishnan | |

FOREIGN PATENT DOCUMENTS

| | | |
|---|---|---|
| SE | 521424 C2 | 10/2003 |
| WO | WO 2012/170958 A1 | 12/2012 |
| WO | 2014194939 A1 | 12/2014 |
| WO | WO 2014/194939 A1 | 12/2014 |
| WO | WO 2015/148695 A1 | 10/2015 |
| WO | WO 2015/164380 A1 | 10/2015 |

OTHER PUBLICATIONS

European Search Report for EP Application No. 17835427.0 dated Jan. 14, 2020 (11 pages).
European Search Report for EP Application No. 17835423.9 dated Jan. 14, 2020 (12 pages).
Office Action for U.S. Appl. No. 15/664,804 dated Apr. 22, 2019.
Apple Patents Ticketing System Article; The Telegraph UK; Apr. 18, 2010 Website visited Oct. 2, 2017 http://www.telegraph.co.uk/technology/apple/7598997/Apple-patents-ticketing-system.htm.
Mar. 18, 2020 Office Action issued in U.S. Appl. No. 15/664,804.
International Search Report and Written Opinion of the International Search Authority for corresponding International Application No. PCT/US2017/044718 dated Oct. 17, 2017.
International Search Report and Written Opinion of the International Search Authority for corresponding International Application No. PCT/US2017/044721 dated Oct. 20, 2017.
International Search Report and Written Opinion of the International Search Authority for corresponding International Application No. PCT/US2017/044732 dated Oct. 17, 2017.
Final Office Action for U.S. Appl. No. 15/664,804; dated Aug. 4, 2020; 45 pages.
Final Office Action for U.S. Appl. No. 15/664,804; dated Nov. 7, 2019; 28 pages.
Communication pursuant to Article 94(3) for EP Application No. 17835423.9 dated Feb. 18, 2021; 9 pages. {New art cited herein—all other art has been previously in this application.}.
Non Final Office Action dated Mar. 3, 2021 issued in U.S. Appl. No. 15/664,804. 43 pages.
Communication pursuant to Article 94(3) for EP Application No. 17835424.7 dated Apr. 28, 2021: 9 pages.
U.S. Final Office Action in U.S. Appl. No. 15/664,786, dated Dec. 7, 2020, 45 pages.

* cited by examiner

| Keywords | Details | Elements | Service Profiles |
|---|---|---|---|
| Ticket Twitter | Schedules ranges | ☑ Active | |
| Ticket Facebook | Schedules Message | Thank you for using our Ticket service from Twitter, for your convenience send a message with the following number to select your preferred schedule. | |

Ticket Time to live (Hours): 3

Ranges window

| Name | Option | Start | End |
|---|---|---|---|
| Especial | 1 | 10 : 0 A.M. ▽ | 4 : 0 P.M. ▽ |

Schedules

| Name | Option | Schedules | Days Allowed |  |  |  |  |  |  |
|---|---|---|---|---|---|---|---|---|---|
| | | | M | TU | W | Th | F | Sa | Su |
| Morning | 1 | 08:00:00 A.M. - 10:00:00 A.M. | ☑ | ☐ | ☐ | ☐ | ☐ | ☑ | ☐ | ⊗
| Evening | 2 | 01:00:00 P.M. - 06:00:00 P.M. | ☐ | ☑ | ☐ | ☐ | ☑ | ☐ | ☑ | ⊗
| Special | 3 | 10:00:00 A.M. - 04:00:00 P.M. | ☐ | ☐ | ☐ | ☑ | ☐ | ☐ | ☐ | ⊗

Confirmation Text: Thank you, your ticket #TicketSQ has been created in the #SchedulesRange schedule. You can introduce yourself to any branch and present your number at the attention kiosk.

FIG. 7

AUTOMATED SOCIAL MEDIA QUEUING SYSTEM

CROSS REFERENCE TO RELATED APPLICATIONS

This application claims the benefit of U.S. Provisional Application No. 62/368,304 filed on Jul. 29, 2016; U.S. Provisional Application No. 62/420,102 filed on Nov. 10, 2016; and U.S. Provisional Application No. 62/510,316 filed on May 24, 2017 the entire contents of each are hereby incorporated herein by reference. By extension, U.S. application Ser. Nos. 15/664,786 and 15/664,804, the non-provisional applications of the above-noted provisional applications, are also each are hereby incorporated herein by reference.

TECHNICAL FIELD

The invention generally relates to queue management and, more particularly, relates to an automated queuing system.

BACKGROUND OF THE INVENTION

In recent years, social media has become a powerful marketing and customer relations tool throughout the business world, changing the way that individuals and large organizations communicate. Customers may mention or promote companies in public social media postings, post messages on company social media pages, share their interests in particular companies with their friends via social media, check-in at a company location, or the like. Companies may respond to these posts, repost positive messages from a customer, contact a customer via a social media platform, or use the data from social media to advertise their company.

Social media allows a large organization to reach consumers in a directed manner, providing quality communications and responses, with improved reach, frequency, accessibility, usability, immediacy and permanence over traditional paper-based or TV/radio advertising. Corporate use of social media has powerful implications—it may strengthen customer relations, positively impact advertising and marketing efforts, provide market research, increase the company's customer base, and/or address customer concerns, among other benefits.

Despite the numerous business advantages involved with social media use, responding to volumes of posts on various social media platforms may utilize significant company resources. Some companies may utilize dedicated employees to review and respond to posts on social media platforms, which may allow for relatively quick response times, but also may be very resource intensive. Other companies may only sporadically check social media platforms for postings, thereby missing valuable customer relations opportunities. Still further companies may not utilize social media at all, which may save on resource utilization, but fails to capitalize on the benefits that social media may provide, such as marketing, customer base growth, and strengthening of customer relations.

BRIEF SUMMARY OF THE INVENTION

In an example embodiment, an automated queue is provided including processing circuitry configured to receive one or more posts from a social media platform associated with a target entity, generate a case including the content of a post, enter the case in a virtual queue for agent review, in response to the case reaching the front of the virtual queue, causing the content to be displayed to an agent on a user interface, receive a response from the user interface, and cause the response to be posted to the social media platform.

BRIEF DESCRIPTION OF THE DRAWING(S)

Having thus described the automated queue in general terms, reference will now be made to the accompanying drawings, which are not necessarily drawn to scale, and wherein:

FIG. 7 illustrates an example keyword interface according to an example embodiment;

DETAILED DESCRIPTION

Figure 1:
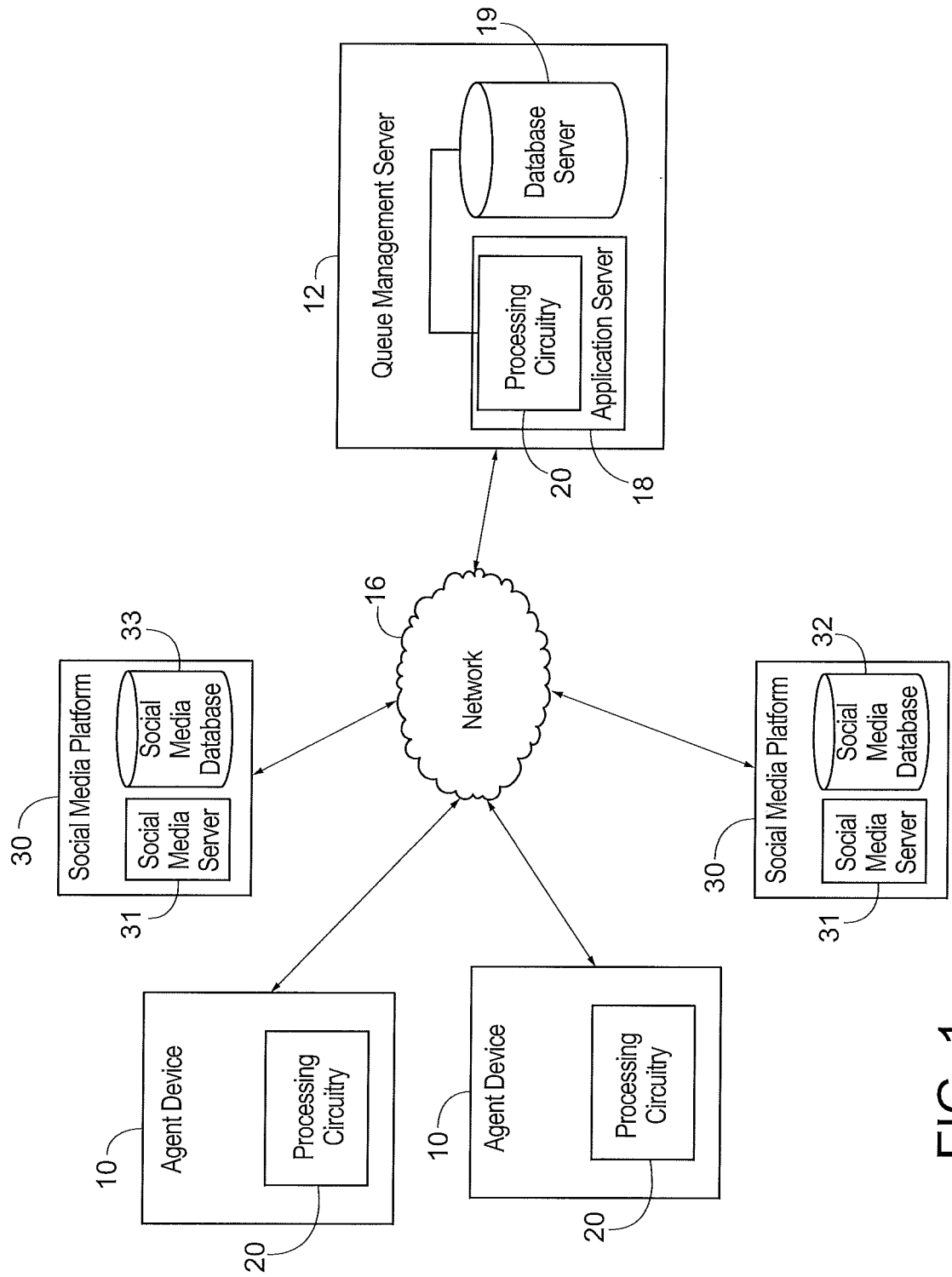
FIG. 1 illustrates a block diagram of a system according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true.

As used in herein, the terms "component," "module," and the like are intended to include a computer-related entity, such as but not limited to hardware, firmware, or a combination of hardware and software. For example, a component or module may be, but is not limited to being, a process running on a processor, a processor, an object, an executable, a thread of execution, and/or a computer. By way of example, both an application running on a computing device and/or the computing device can be a component or module. One or more components or modules can reside within a process and/or thread of execution and a component/module may be localized on one computer and/or distributed between two or more computers. In addition, these components can execute from various computer readable media having various data structures stored thereon. The components may communicate by way of local and/or remote processes such as in accordance with a signal having one or more data packets, such as data from one component/ module interacting with another component/module in a local system, distributed system, and/or across a network such as the Internet with other systems by way of the signal. Each respective component/module may perform one or more functions that will be described in greater detail herein. However, it should be appreciated that although this example is described in terms of separate modules corresponding to various functions performed, some examples may not necessarily utilize modular architectures for employment of the respective different functions. Thus, for example, code may be shared between different modules, or the processing circuitry itself may be configured to perform all of the functions described as being associated with the components/modules described herein. Furthermore, in the context of this disclosure, the term "module" should not be understood as a nonce word to identify any generic means for performing functionalities of the respective modules. Instead, the term "module" should be understood to be a modular component that is specifically configured in, or can be operably coupled to, the processing circuitry to modify the behavior and/or capability of the processing circuitry based on the hardware and/or software that is added to or otherwise operably coupled to the processing circuitry to configure the processing circuitry accordingly.

Among its many advantages, an automated queue as described herein fulfills three important objectives:—1. obtain, filter, organize and direct social media content to a target entity (e.g. profit business, non-profit organization, government organizations, etc.)—2. direct the content of social media to particular individuals within the target entity, based on pre-defined characteristics (i.e. employee qualifications, availability, spoken language, etc.)—3. create appointments automatically according to the request of the customer's post. Therefore, the target entity avoids having to browse the Internet for publications related to its business, as well as having to execute countless searches, which are often yield few or no relevant results, in various engines and social networks. In addition, the target entity avoids having to designate a specific person to perform such tasks and. Instead, the queuing system takes advantage of the inactivity of idle agents (call center, branches or back-offices) to assign them social media response. Finally, the target entity can provide appointment functionalities through social networks, allowing the client to request an appointment with the feature that the platform is automatic and does not require agent resources. The system, therefore, improves the target entity's ability to communicate and respond to its customer base, without sacrificing existing employee productivity or adding additional employees.

The automated queue can receive social media messages, e.g. posts from an account associated with the target entity, such as public posts, then the automated queue will sort the post based on a determination that the post is an appointment request, a request for assistance, or a mention or a general information request.

In an example embodiment, a customer may post general information or requests general information from a social media network associated with the target entity. Any publication such as positive customer notices or general request associated with services or promotions that does not require disclosure of private information may be considered "general information". Some example general information posts may include: "I love your service." "When will Galaxy S8 be available at your retail locations?" "Do you expect to continue the family plan for 2018?" "I'm at the subway station 15, where's the nearest retail branch?" The automated queue may assign a response to a post to a specific agent based on their knowledge, skills, availability, etc. For general information, the agent may respond to the post publicly and once the post is answered the conversation may be closed. The agent may respond with a "like", emoticons, pre-configured responses, or other suitable response. All messages associated with the interaction may be associated with a single case number generated by the automated queue for transaction record, quality assurance, and/or analytics. Some of Key productivity indicator (KPI)) analytics associated with general information responses include, without limitation: response time, resolution time, post type recurrence.

In an example embodiment, a customer may request sales or support assistance or post complaints through social networks. Some example assistance and complaint posts may include: "Your service is very bad", "my cellphone no longer works, Can anybody help me?", "I need to add my daughter to my family plan, Can anybody help me?" The automated queue may determine a category and/or categorize the post based on its content (i.e. provocative, questions, criticism, negative, neutral, positive, recommended, highly recommended, or the like.) In some examples, keywords in the content may be indicative of upset, dissatisfied, or unhappy customers, for whom a quick response can improve the problem, correct it or even reinforce the relationship. In such cases, the automated queue may enable an urgent categorization to be associated with such posts, queuing them to be answered accordingly. For example, publications with urgent categorization may automatically be queued ahead of posts without categorization, or categorization indicating that the content is positive. The automated queue can assign the response to an agent based on his availability, skills, language, etc. In some cases, the automated queue may allow an agent to determine whether the type of interaction assigned or the category is incorrect and to change one or both. The agent may respond to the re-categorized post or place the post back in the virtual queue for another agent to respond. In either case, the automated queue may open a conversation, e.g. direct message within the social media platform, between the agent and the client, which may be closed by the agent when the claim or request of the client is satisfied. All messages related to the conversation will be associated with a single case number generated by the automated queue for transaction record, quality assurance, and/or analytics. In some example embodiments, the conversation may be associated to a single or multiple agents using criteria such as, availability and service level agreement (SLA). Some of the KPI analytics for assistance and complaint posts include, without limitation, response time, resolution time, post-type recurrence.

In another example, the automated queue may enable one or more keywords to activate time scheduling with a live agent, such as: a time to respond messages within the social media platform, or an in-person time at a physical location. In an example embodiment, the client may send a private message to, or in some instances a public post identifying, the target entity, with a keyword like "appointment". The automated queue may recognize the request and send an automatic response to the client that provides "n" number of scheduling options, depending on the current availability of the branch. The client may reply a message with the option of his preference. In some example embodiments, the automated queue may also send a confirmation code, such as a 6 digit confirmation code, that the client enter at a branch office reception kiosk.

Some example embodiments described herein provide an automated queue which may be configured to receive information request messages or complaints publications or posts associated with a target entity from one or more social media platforms, and enter the posts in a virtual queue for an agent of the target entity to respond. In some embodiments, the agent may be a support assistance or a sales representative, an administrator, or the like which is not fully engaged by their regular duties. For example, the automated queue may receive agent availability data indicating that sales at a store are slow and that there are three sales representatives on duty. The automated queue may determine or receive data indicating that two of the representatives may engage in alternative duties and route one or more of the social media posts to the two representatives for response. The system will allow the individuals to draft responses to the social media concerns and will post the same to the social media site. The inventive system may allow for engagement of under-tasked employees or representatives, relatively fast response times to social media posts, all without increased human resource requirements.

In an exemplary embodiment, the agent may determine that the post is a troll, e.g. a post which is inflammatory and posted with the intent of upsetting readers into an emotional response, or otherwise disrupting normal, on-topic discussion. The system may enable the agent to indicate that the post is a troll post and the automated queue may cause the author to be blocked from further posts, such as blocking the user identity from posting on a public portion of the social media account associated with the target entity. In some embodiments, the automated queue may send a request to the social media provider to block the poster, to prevent abuse of the social media platform.

In an example embodiment, the automated queue may retrieve, generate, compile, update or save customer data based on user identity or information associated with the post.

As is further described herein, embodiments of the system are necessarily rooted in computer technology in order to overcome one or more problems specifically arising in the realm of computer networks, specifically, social media networking and electronic communication. Additionally, embodiments of the automated queue focus on methods of improving electronic communications within social media networks.

Example System Architecture

FIG. 1 illustrates an example system in which an embodiment of the present invention may be employed. The system may include one or more agent devices 10. Each one of the agent devices 10 may include or otherwise be embodied as computing device (e.g. a computer, a network access terminal, a personal digital assistant (PDA), cellular phone, smart phone, wearable computer, service kiosk, or the like) capable of communication with a network 16. As such, for example, each one of the agent devices 10 may include (or otherwise have access to) memory for storing instructions or applications for the performance of various functions and a corresponding processor or processing circuitry 20 for executing stored instructions or applications. Each one of the agent devices 10 may also include software and/or corresponding hardware for enabling the performance of the respective functions of the agent devices 10, as described below. In an example embodiment, one or more of the agent devices 10 may include a client application configured to operate in accordance with an example embodiment of the present invention. In this regard, for example, the client application may include software for enabling a respective one of the agent devices 10 to communicate with the network 16 for requesting and/or receiving information and/or services via the network 16. Moreover, in some embodiments, the information or services that are requested via the network may be provided in software as a service (SAS) environment. The information or services receivable at the client applications may include deliverable components (e.g. downloadable software to configure the user agent devices 10, or information for consumption/processing at the agent devices 10). As such, for example, the client application may include corresponding executable instructions for configuring the user agent devices 10 to provide corresponding functionalities for automated queuing, as described in greater detail below.

The network 16 may be a data network, such as a local area network (LAN), a metropolitan area network (MAN), a wide area network (WAN) (e.g. the Internet), and/or the like, which may couple the agent devices 10 to devices such as processing elements (e.g. personal computers, server computers or the like) and/or databases. Communication between the network 16, the user agent devices 10 and the devices or databases (e.g. servers) to which the agent devices 10 are coupled may be accomplished by either wireline or wireless communication mechanisms and their corresponding communications protocols.

In an example embodiment, devices to which the agent devices 10 may be coupled via the network 16 may include one or more servers, e.g. application servers 18 and/or database servers 19 (e.g. queue management server 12). It is noted that the example embodiments of the system discussed herein are scalable to include any number of servers or agent devices 10. Similarly, a server 12 may have one or a plurality of application servers 18 and/or database servers 19. Although the application server 18 and the database server 19 are each referred to as "servers," this does not necessarily imply that they are embodied on separate servers or devices. As such, for example, a single server or device may include both entities and the database server 19 could merely be represented by a database or group of databases physically located on the same server or device as the application server 18. The application server 18 and the database server 19 may each include hardware and/or software for configuring the application server 18 and the database server 19, respectively, to perform various functions. As such, for example, the application server 18 may include processing circuitry 20, including a processor and memory enabling the application server 18 to access and/or execute stored computer readable instructions for performing various functions. In an example embodiment, one function that may be provided by the application server 18 may be the provision of access to information and/or services related to operation of the terminals or computers with which the agent devices 10 are associated. For example, the application server 18 may be configured to provide for storage of information descriptive of financial account data or product pricing data. In some cases, these contents may be stored in the database server 19. Alternatively or additionally, the application server 18 may be configured to provide analytical tools for use by the agent devices 10 in accordance with example embodiments.

In an example embodiment, the agent devices 10 and or the queue management server 12 may be in data communication with one or more social media platforms via the network 16. The social media platforms 30 may include one or more social media servers and/or social media databases 33 configured to host social media operations, such as posting photographs or written content, sending messages, hosting profiles, or the like. In some example embodiments, social media platforms may include any website or mobile application that enables users to create and share content (i.e. biographical information, written comments, photographs, videos) or to participate in social networking. Social media platforms may include, without limitation, Facebook, Twitter, Instagram, LinkedIn, Pinterest, Reddit, SnapChat, Tumblr, Google+, Gab, Viber, WeChat, Weibo, Baidu Tieba, WhatsApp, YouTube, and/or the like. It should be understood that the present invention may also be used in connection with websites and mobile applications which allow users to search for service providers, for example, Yelp!, Zomato, ServisHero, AroundMe, Trip Advisor, Yahoo! Search, Superpages Local Search, Google Maps, Yellow Pages Local Search, Citysearch, TellMeWhere, and/or Angie's List (referred to as local search and review websites or apps). In some embodiments, these websites and mobile applications use GPS technology to identify local or nearby service providers. In some embodiments, the websites and mobile applications use customer reviews to recommend service providers. Any similar website or mobile application could be used in the present invention.

Figure 2:
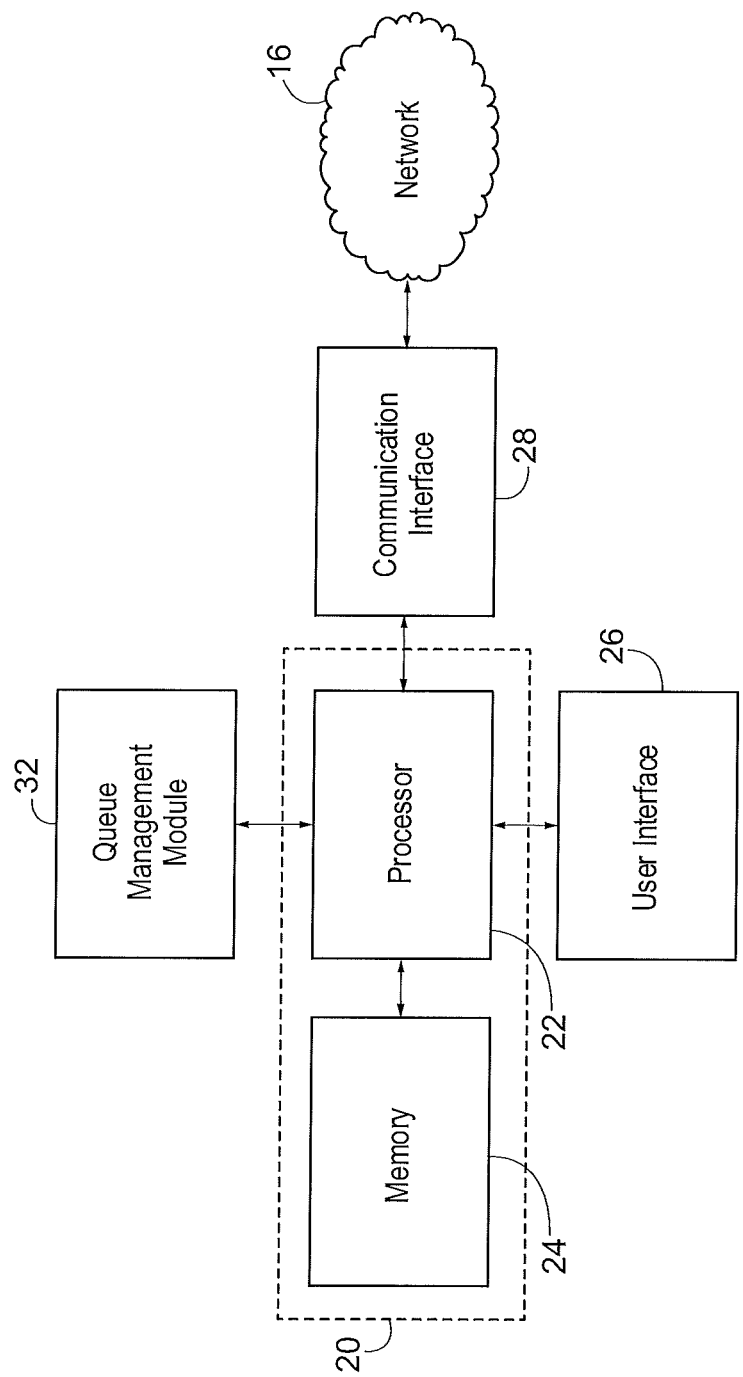
FIG. 2 illustrates a block diagram of an apparatus for an automated queue according to an example embodiment.

In some embodiments, for example, the application server 18 may therefore include an instance of a queue management module 32, shown in FIG. 2, comprising stored instructions for handling activities associated with practicing example embodiments as described herein. As such, in some embodiments, the agent devices 10 may access the queue management module 32 online and utilize the services provided thereby. However, it should be appreciated that in other embodiments, the queue management module 32 may be provided from the application server 18 (e.g. via download over the network 16) to one or more of the user devices to enable recipient agent devices 10 to instantiate an instance of the queue management module 32 for local operation. As yet another example, the queue management module 32 may be instantiated at one or more of the agent devices 10 responsive to downloading instructions from a removable or transferable memory device carrying instructions for instantiating the queue management module 32 at the corresponding one or more of the agent devices 10. In such an example, the network 16 may, for example, be a peer-to-peer (P2P) network where one of the user devices includes an instance of the queue management module 32 to enable one of the user devices to act as a server to the other user devices. In a further example embodiment, the queue management module 32 may be distributed amongst one or more agent devices 10 and/or the application server 18.

In an example embodiment, the application server 18 may include or have access to memory (e.g. internal memory or the database server 19) for storing instructions or applications for the performance of various functions and a corresponding processor for executing stored instructions or applications. For example, the memory may store the queue management module 32 configured to operate in accordance with an example embodiment of the present invention. In this regard, for example, the queue management module 32 may include software for enabling the application server 18 to communicate with the network 16 and/or the agent device 10 for the provision and/or receipt of information associated with performing activities as described herein. Moreover, in some embodiments, the application server 18 may include or otherwise be in communication with an access terminal (e.g. a computer including a user interface) via which analysts may interact with, configure or otherwise maintain the system.

An example embodiment will now be described with reference to FIG. 2. FIG. 2 shows certain elements of an apparatus for management of a virtual queue according to an example embodiment. The apparatus of FIG. 2 may be employed, for example, on a device (e.g. any of the agent devices 10 of FIG. 1) or a variety of other devices (such as, for example, a network device, server, proxy, or the like (e.g. an application server 18 of FIG. 1)). Alternatively, embodiments may be employed on a combination of devices. Accordingly, some embodiments of the present invention may be embodied wholly at a single device (e.g. the application server 18 or one or more agent devices 10) or by devices in a client/server relationship (e.g. the application server 18 and one or more agent devices 10). Furthermore, it should be noted that the devices or elements described below may not be mandatory and thus some may be omitted in certain embodiments.

In an example embodiment, the apparatus may include or otherwise be in communication with processing circuitry 20 that is configured to perform data processing, application execution and other processing and management services according to an example embodiment of the present invention. In one embodiment, the processing circuitry 20 may include a memory 24 and a processor 22 that may be in communication with or otherwise control a user interface 26 and a communication interface 28. As such, the processing circuitry 20 may be embodied as a circuit chip (e.g. an integrated circuit chip) configured (e.g. with hardware, software or a combination of hardware and software) to perform operations described herein. However, in some embodiments, the processing circuitry 20 may be embodied as a portion of a server, computer, laptop, workstation or even one of various mobile computing devices or wearable computing devices. In situations where the processing circuitry 20 is embodied as a server or at a remotely located computing device, the user interface 26 may be located on another device (e.g. at a computer terminal or client device such as one of the agent devices 10) that may be in communication with the processing circuitry 20 via the device interface 28 and/or a network (e.g. network 16).

The user interface 26 may be an input/output device for receiving instructions directly from a user. The user interface 26 may be in communication with the processing circuitry 20 to receive a user input via the user interface 26 and/or to present output to a user as, for example, audible, visual, mechanical or other output indications. The user interface 26 may include, for example, a keyboard, a mouse, a joystick, a display (e.g. a touch screen display), a microphone, a speaker, or other input/output mechanisms. Further, the processing circuitry 20 may comprise, or be in communication with, user interface circuitry configured to control at least some functions of one or more elements of the user interface 26. The processing circuitry 20 and/or user interface circuitry may be configured to control one or more functions of one or more elements of the user interface 26 through computer program instructions (e.g. software and/or firmware) stored on a memory device accessible to the processing circuitry 20 (e.g. volatile memory, non-volatile memory, and/or the like). In some example embodiments, the user interface circuitry is configured to facilitate user control of at least some functions of the apparatus through the use of a display configured to respond to user inputs. The processing circuitry 20 may also comprise, or be in communication with, display circuitry configured to display at least a portion of a user interface 26, the display and the display circuitry configured to facilitate user control of at least some functions of the apparatus.

The communication interface 28 may be any means embodied in either hardware (e.g., device or circuitry), software, or a combination of hardware and software that is configured to receive and/or transmit data from/to a network and/or any other device or module in communication with the apparatus. The communication interface 28 may also include, for example, an antenna (or multiple antennas) and supporting hardware and/or software for enabling communications with the network 16 or other devices (e.g. a agent device 10). In some environments, the communication interface 28 may alternatively or additionally support wired communication. As such, for example, the communication interface 28 may include a communication modem and/or other hardware/software for supporting communication via cable, digital subscriber line (DSL), universal serial bus (USB) or other mechanisms. In an exemplary embodiment, the communication interface 28 may support communication via one or more different communication protocols and/or methods. In some cases, IEEE 802.15.4 based communication techniques such as ZigBee or other low power, short range communication protocols, such as a proprietary technique based on IEEE 802.15.4 may be employed along with radio frequency identification (RFID) or other short range communication techniques.

In an example embodiment, the memory 24 may include one or more non-transitory storage or memory devices such as, for example, volatile and/or non-volatile memory that may be either fixed or removable. The memory 24 may be configured to store information, data, applications, instructions or the like for enabling the apparatus to carry out various functions in accordance with example embodiments of the present invention. For example, the memory 24 could be configured to buffer input data for processing by the processor 22. Additionally or alternatively, the memory 24 could be configured to store instructions for execution by the processor 22. As yet another alternative, the memory 24 may include one of a plurality of databases (e.g. database server 19) that may store a variety of files, contents or data sets. Among the contents of the memory 24, applications (e.g. client applications or service application) may be stored for execution by the processor 22 in order to carry out the functionality associated with each respective application.

The processor 22 may be embodied in a number of different ways. For example, the processor 22 may be embodied as various processing means such as a microprocessor or other processing element, a coprocessor, a controller or various other computing or processing devices including integrated circuits such as, for example, an ASIC (application specific integrated circuit), an FPGA (field programmable gate array), a hardware accelerator, or the like. In an example embodiment, the processor 22 may be configured to execute instructions stored in the memory 24 or otherwise accessible to the processor 22. As such, whether configured by hardware or software methods, or by a combination thereof, the processor 22 may represent an entity (e.g. physically embodied in circuitry) capable of performing operations according to embodiments of the present invention while configured accordingly. Thus, for example, when the processor 22 is embodied as an ASIC, FPGA or the like, the processor 22 may be specifically configured hardware for conducting the operations described herein. Alternatively, as another example, when the processor 22 is embodied as an executor of software instructions, the instructions may specifically configure the processor 22 to perform the operations described herein.

In an example embodiment, the processor 22 (or the processing circuitry 20) may be embodied as, include or otherwise control the queue management module 32, which may be any means, such as, a device or circuitry operating in accordance with software or otherwise embodied in hardware or a combination of hardware and software (e.g. processor 22 operating under software control, the processor 22 embodied as an ASIC or FPGA specifically configured to perform the operations described herein, or a combination thereof) thereby configuring the device or circuitry to perform the corresponding functions of the queue management module 32, as described below.

The queue management module 32 may include tools to facilitate social media post queuing via the network 16. In an example embodiment, the queue management module 32 may be configured to receive one or more posts from a social media platform associated with a target entity, generate a case including the content of a post, enter the case in a virtual queue for agent review, in response to the case reaching the front of the virtual queue, causing the content to be displayed to an agent on a user interface, receive a response from the user interface, and cause the response to be posted to the social media platform.

Example Social Media Queue Management

Figure 3A:
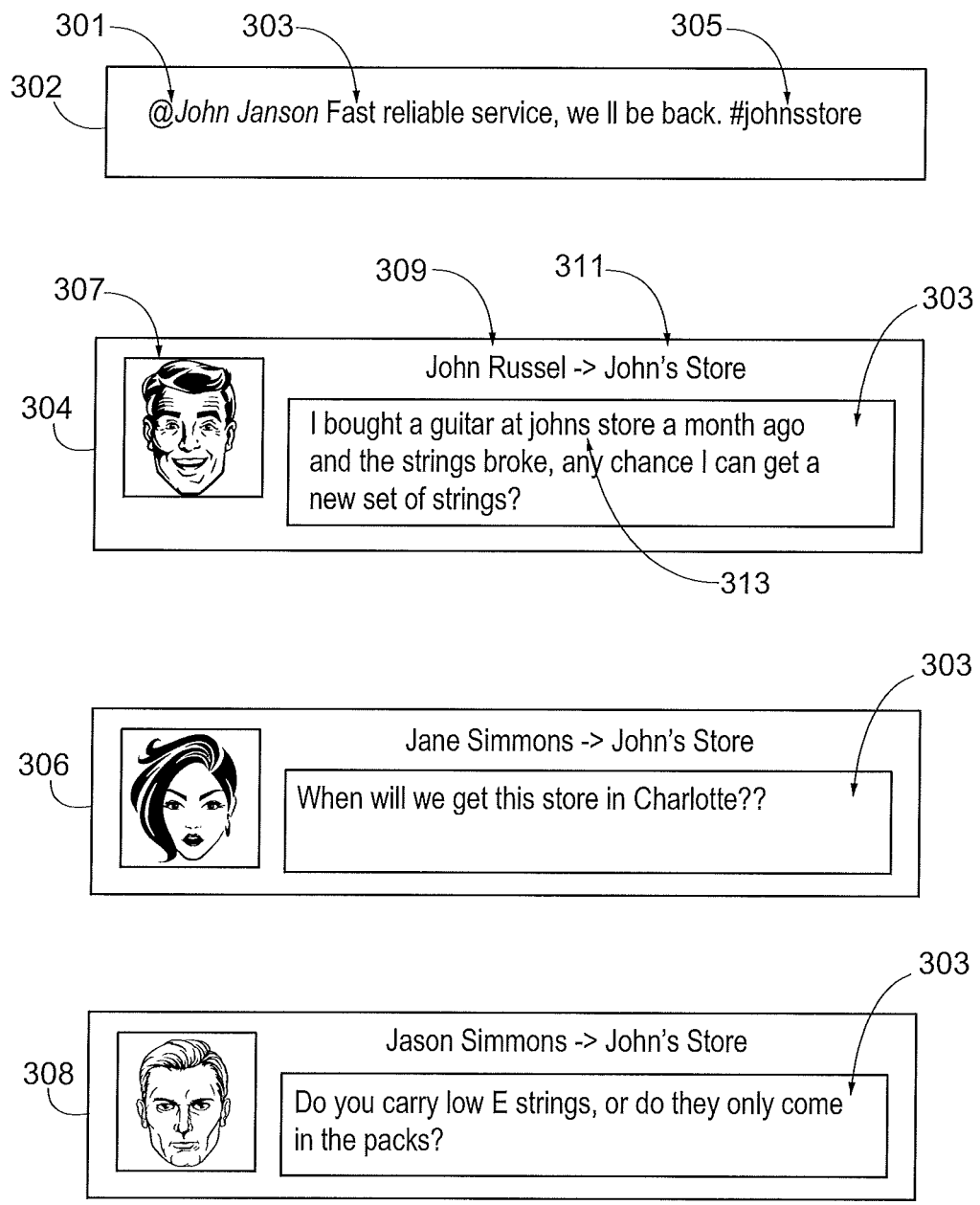
FIGS. 3A and 3B illustrate example social media posts according to an example embodiment.
Figure 3B:
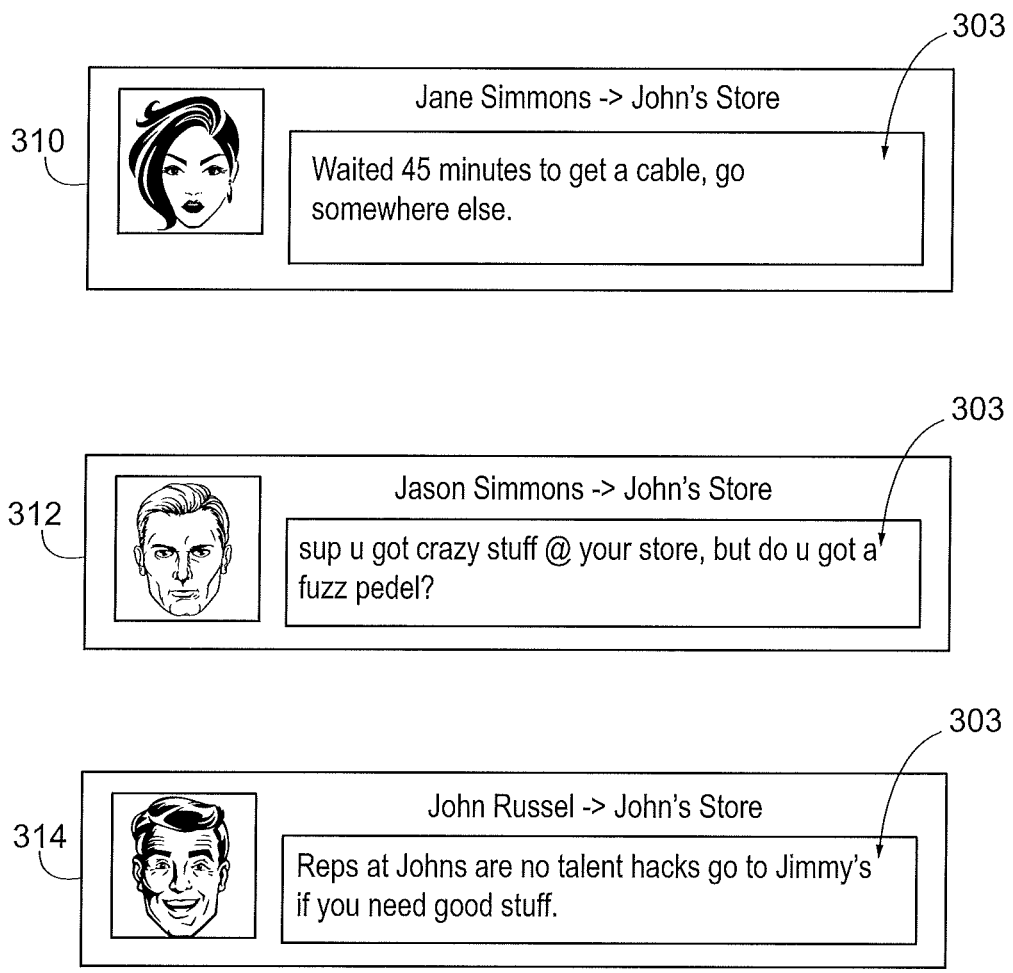

FIGS. 3A and 3B illustrate example social media posts according to an example embodiment. Social media platforms 30, such as Facebook, Twitter, Instagram, or the like may enable one or more users to post comments, pictures, locations, or the like in public or private posts. The term "post" as used herein shall be construed as a piece of writing, image, or other item of content published online. The posts may be published to a public page or account associated with a target entity, e.g. a company, personality, or the like. Public posts on social media platforms may take a variety of forms, such as mentions in which the target entity name is used in the post incidentally or specifically, e.g. a tag or hashtag, a comment to a public wall or timeline, a location check-in, or the like. Additionally or alternatively, private posts may include direct messaging or texting to an inbox associated with a social media account. An example post 302 may include a user name 301, here John Johnson, content 30, such as "Fast reliable service, we'll be back.", and a hashtag 305 identifying the target entity, such as #johnsstore. Another example post 304 may include a profile picture 307, a user name 309, content 303, and a target entity identifier, such as a post directed at the target entity by name 309 or in a mention 313 in the content.

An automated social media queue, e.g. automated queue, may be configured to automatically receive one or more posts from one or more social media platforms 30. The automated queue may receive public and private posts directed toward the target entity, such as by a tag, check-in, of posting directly to the account associated with the target entity, or the like. Alternatively or additionally, the automated queue may be configured to search one or more social media platforms 30 for posts associated with the target entity, such as a search for the name of the target entity, abbreviations of the name of the target entity, common misspellings of the name of the target entity, slang terms for the target entity, or the like.

Similarly, the automated queue may allow users to enter a virtual queue through a social media platform. For example, a user could be looking at restaurants in the Yelp® or Zomato® application and once he or she finds one that is acceptable, may add their party to the queue for a table through the social media application. The inventive system then receives that information and immediately adds the user to the virtual queue for service. Similarly, a user could be added to a queue for a dentist, beauty salon, bank, or hospital using similar web or mobile applications in connection with the inventive system. In this respect, the inventive system could aid in virtually queuing any service provider using any web or mobile application.

Additionally, or alternatively, the user may indicate their presence at a physical location (such as arrival at a branch location) using the social media platform. This may be accomplished in any manner known in the art, for example, by messaging, replying, or responding within the social media platform with a key word (e.g. "here") or by using an automatic or manually-initiated location checking (a "check-in") within the social media platform, or the like. For example, a customer may use the Facebook® "Check In" feature to simultaneously check in with the Facebook® application and be added to the inventive virtual queuing system. In this example, the inventive system is integrated with the Facebook® application such that it receives the "Check In" information immediately and uses that information to update its virtual queue.

Similarly, an individual may use a QR code provided by the service provider, directly or through the social media platform, to check-in. Similarly, the system may integrate with social media platforms to use GPS or beacon technology to check a customer in with a service provider. Such systems are incorporated herein by reference. In response to receiving an indication of the presence of the user, the automated queue may enter the user into the virtual queue or notify the agent, as discussed above. In some example embodiments, the automated queue may notify the user that they are at the front of the virtual queue for service using the social media platform, such as a direct message to the user, replying to a post, or the like. In some instances, the automated queue may determine, acquire and/or store user identity data for each post. The user identity data may include the user name 301, 309, the user profile picture 307, and or profile data associated with user name 301, 309, such as name, current city, birthday, employment, age, gender, education, employer, or the like. The automated queue may then cross reference an internal database to determine if company customer data is available based on the user identity data. The customer data may have been acquired through the customer's creation of an online company account, through purchases the customer made from the company, through previous communications between the customer and the company, or through any other source available to the company. If customer data is available for the particular user, the automated queue may update the customer's information in the database with information acquired from or related to the user's posting. Similarly, the system may provide the agent with both the user identity data and the customer data so that the agent can more appropriately respond to the post. In some example embodiments, based on customer data, automated queuing may improve the customer experience by incorporating priority and customization algorithms, for example, a customer belonging to a preferred customer program, such as "Diamond Segment" and/or a particular "customer portfolio" may be enqueue on high priority, and/or his case may be associated with a particular sales or business executive who has attended that customer before, which may be indicated in the customer data.

Figure 6:
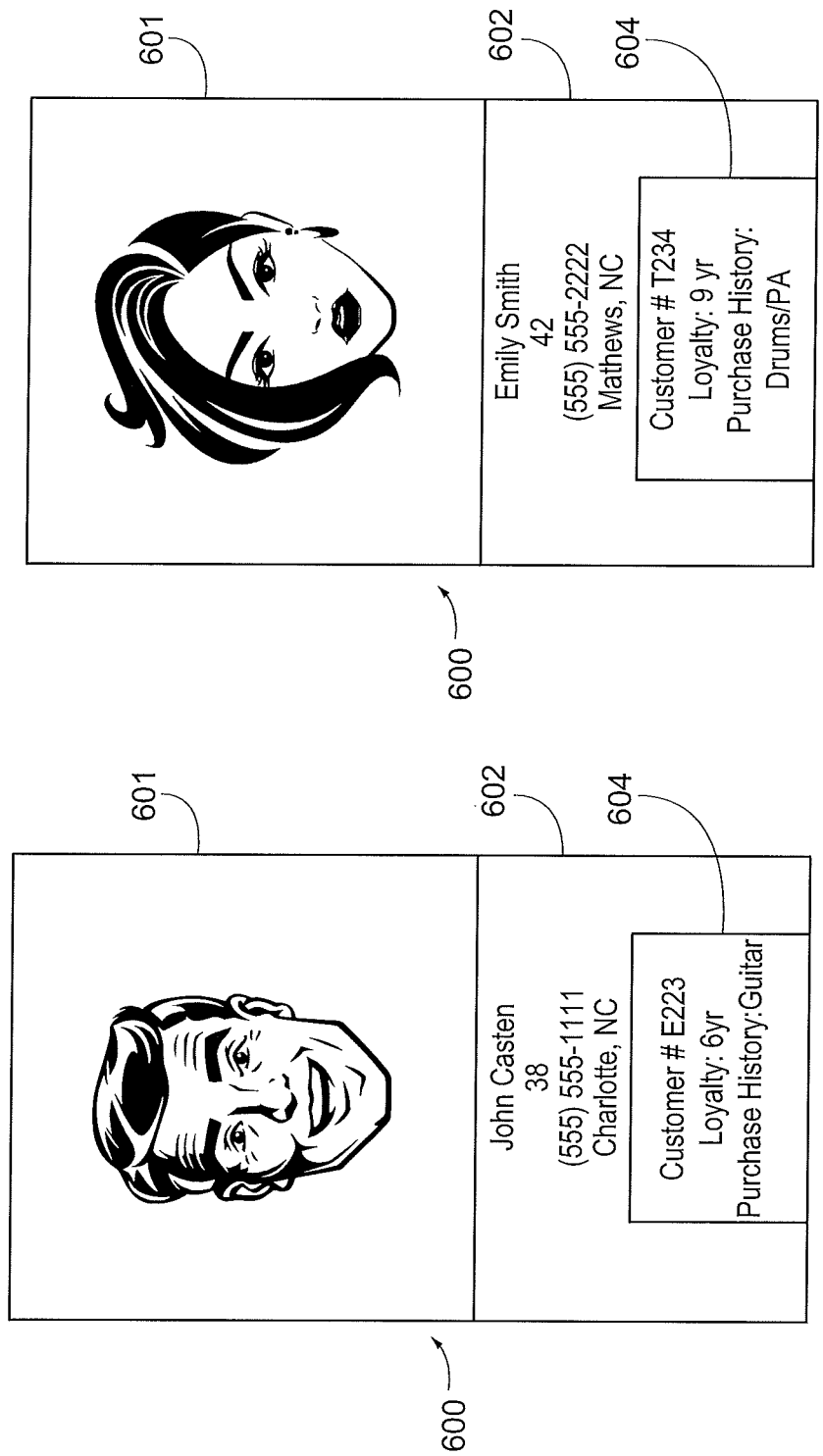
FIG. 6 illustrates example customer data according to an example embodiment.
Figure 8:
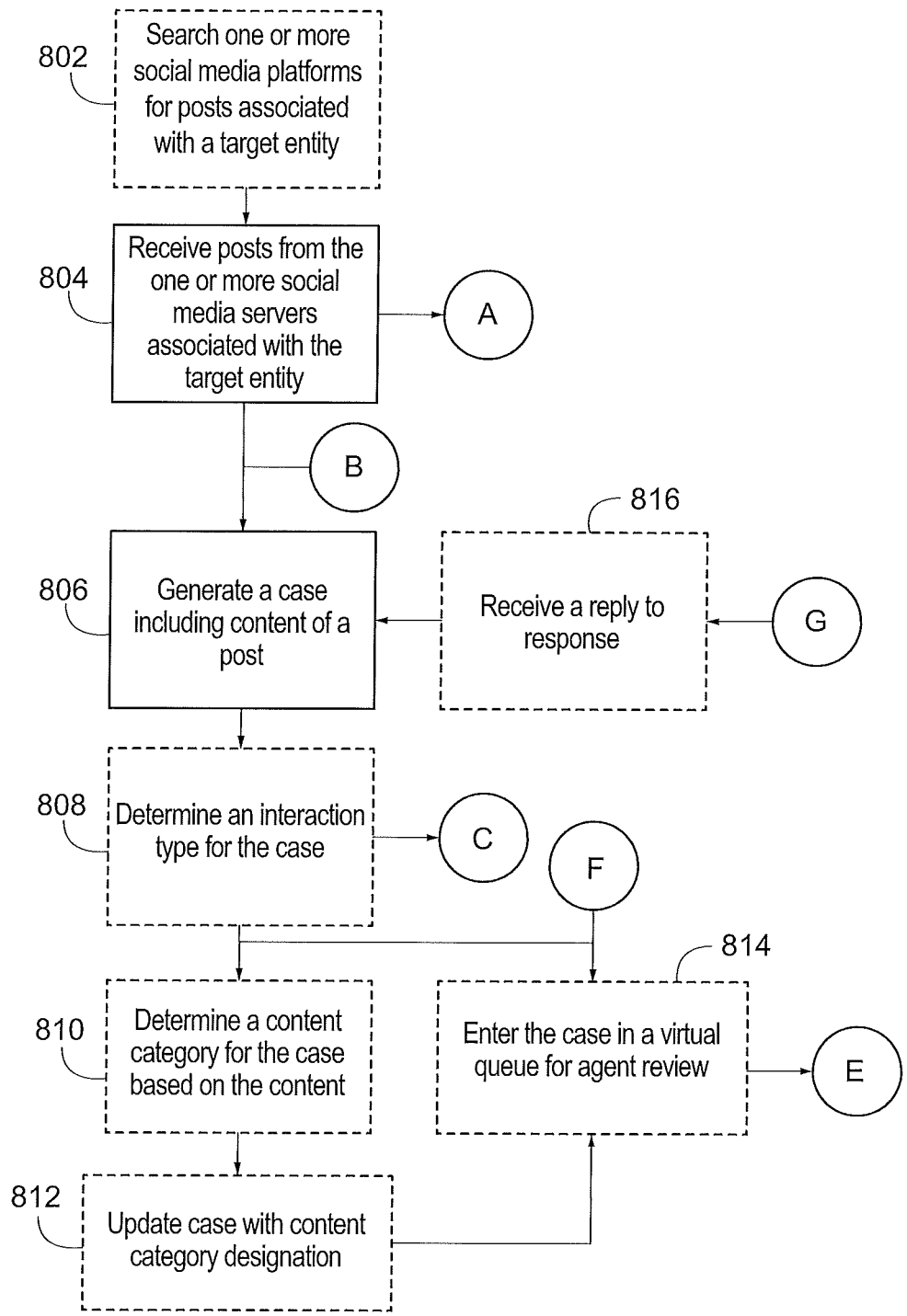
FIGS. 8-11 illustrate methods of automated social media queuing according to an example embodiment.
Figure 9:
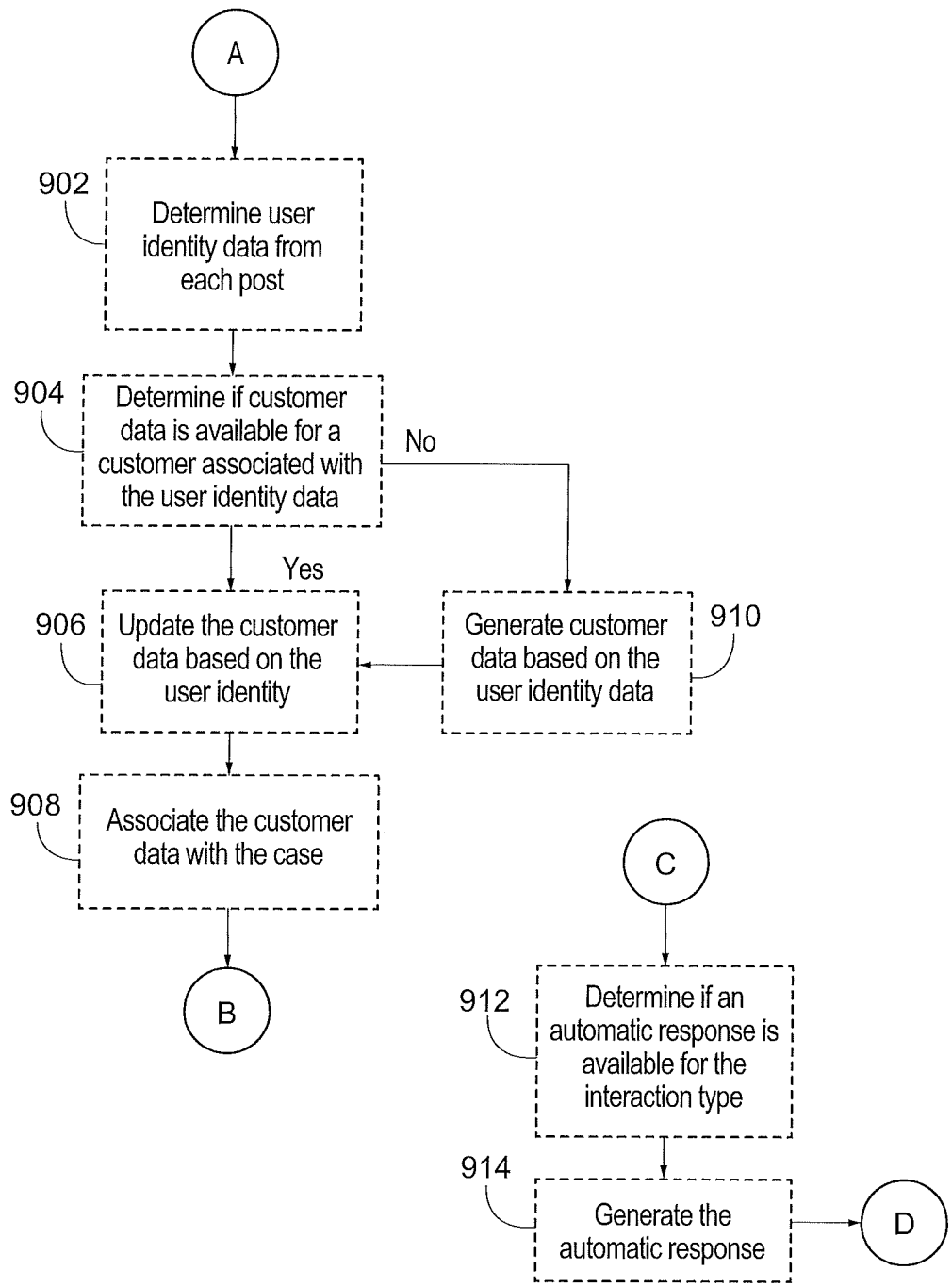
Figure 10:
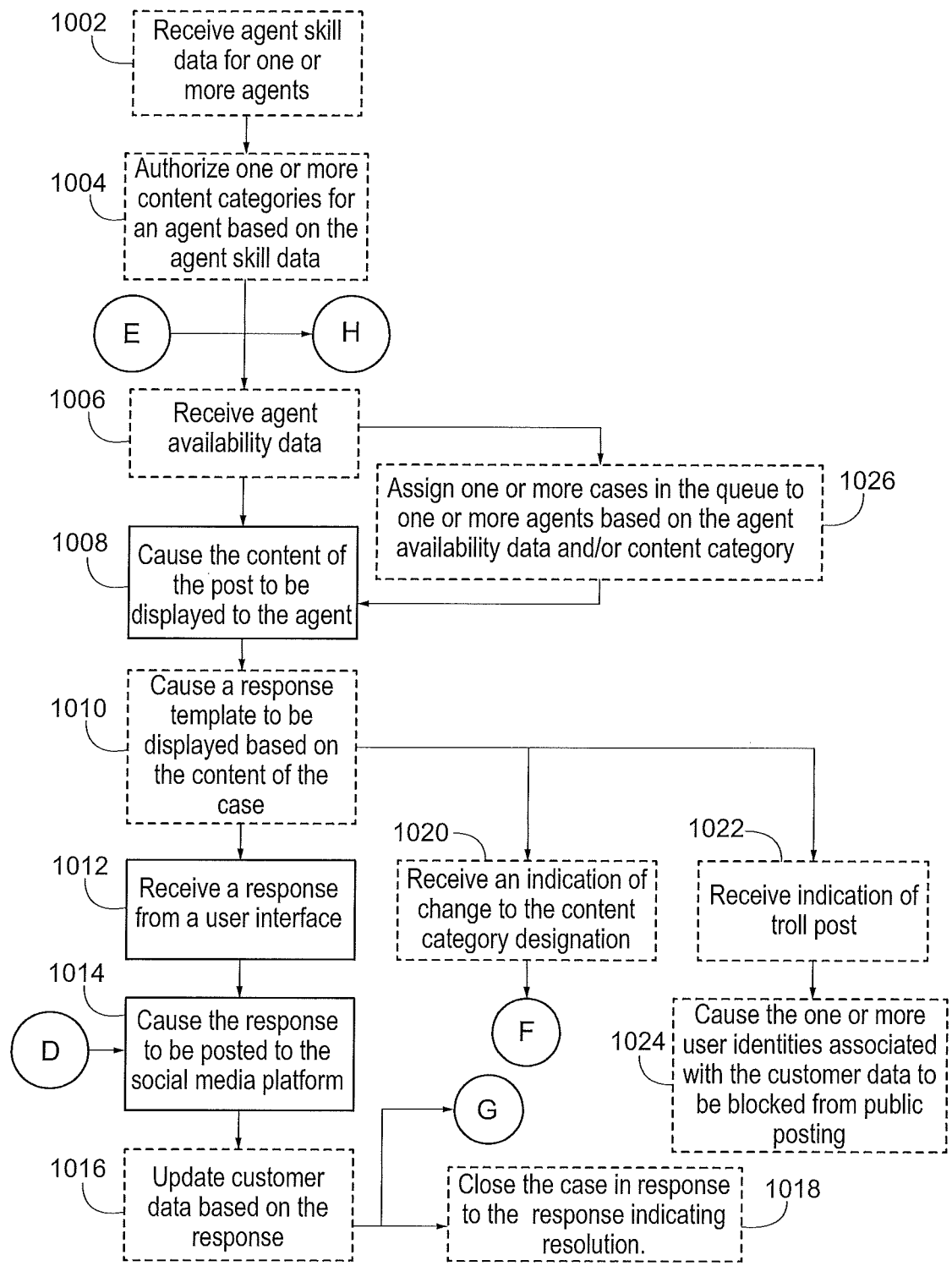
Figure 11:
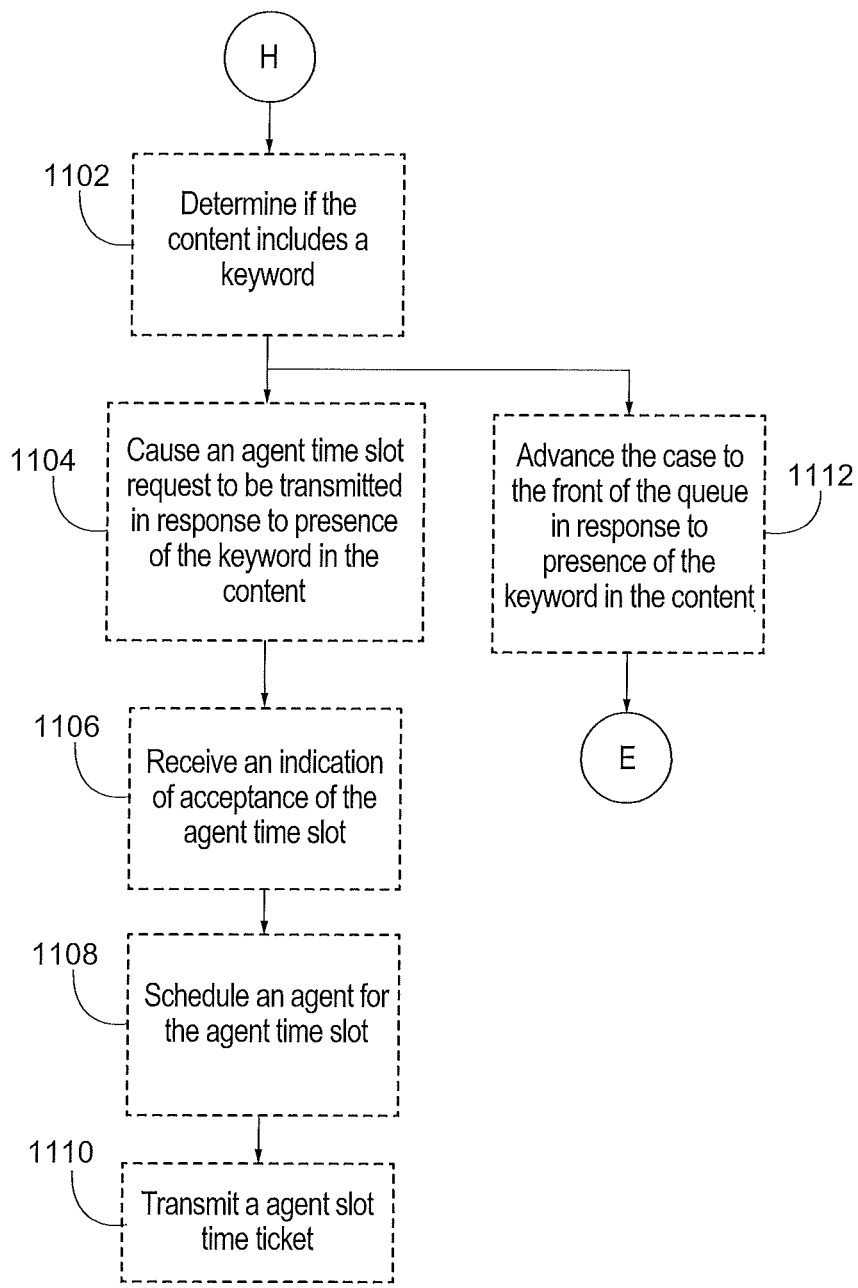

As depicted in FIG. 6, the customer data 600 may include a customer face image 601, which may be a client picture including the customer face, a previously captured image, such as a profile picture 307, or the like. The customer data 600 may also include a customer information portion 602 including name, age, phone number, address, or the like and/or customer tracking or agent information 604, such as a customer identification number length of customer loyalty, purchase history, or the like. The agent information 604 may include information useful to the agent to provide an appropriate response to the customer, such as the customer identification number length of customer loyalty, purchase history, previous posts, or the like.

As noted above, the automated queue may update the customer data based on the user identity data associated with the post, such as entering information in unfilled fields, or updating fields in an instance in which the information does not match. Alternatively, the inventive system may store information acquired from social media sites about the customer in a separate section of the database. If no customer data exists for the posting individual, the automated queue may generate customer data 600 based on the user identity data associated with the post. In an example embodiment, the automated queue may associate the customer data 600 with the content and/or the post. Tracking customer data and associated posts may provide increased marketing understanding and demographic data. Additionally, tracking customer data and associated posts may enable more personal responses and customer interactions, such as adding "happy birthday" to a response or suggesting a purchase based on purchase history and/or the content of the post.

In some example embodiments, the automated queue may generate a case, optionally identified by a case number or other identifier, which includes any customer data, user identity data, and/or the content of the post. The post may be processed, as discussed below, by the automated queue as a case until resolution.

In an example embodiment, the automated queue may determine the interaction type for the case. For example, the interaction type may be a location check-in, a mention, a public direct message a tag, or the like. The automated queue may be configured with one or more automatic responses, such as a "like" or similar acknowledgement response for one or more interaction types. Additionally, the automatic response may include text or an image, such as happy birthday with a featured dessert if the content or customer data is indicative of a birthday and the interaction is a mention or check-in, or "Thanks for joining us" for a check-in. These automatic responses are merely illustrative and one of ordinary skill in the art would immediately appreciate that other automatic responses based on the type of interaction and/or the content of the post may be utilized by the automated queue. The automated queue may generate an automatic response and have publish the automatic response as a reply to the customer who is requesting general information or doing a positive mention to the target entity on the social media platform, as discussed below.

In some example embodiments, the automated queue may determine a content category for the case. Content categories, may be indicative of the post content and/or may indicate a person, department, store, office, or the like which may be best suited to deal with the case. In some instances, the content category may include a hierarchy, such as specific to general category classification, e.g. particular product/service, department associated with the product/service, company sector associated with the product/service, or the like. In an example embodiment in which location data is available or may be determined, such as based on customer data, content or the like, the content category may also include a hierarchy of locations, such as store, city, area, region, or the like. The automated queue may search the content for terms associated with one or more categories and update the case with a content category designation. The automated queue may include one or more preset terms for each content category and/or may be configured for machine learning based on subsequent re-categorization, as discussed below. The machine learning may include decision tree learning, association rule learning, inductive logic programming, support vector learning, clustering, similarity and metric learning, or the like.

Turning to the examples of FIGS. 3A and 3B, post 302 includes content 303 "Fast reliable service, we'll be back" and may be categorized as a positive experience, no location, positive mention. Post 304 includes content 303 "I bought a guitar at johns store a month ago and the strings broke, any chance I can get a new set of strings?" and may be categorized as guitar, defective product/service and/or a support assistance request. Additionally, customer data associated with the case may be used to identify the store the product or service was purchased at and/or the nearest location, which may also be added to the classification. Post 306 includes content 303 "When will we get this store in Charlotte??" and may be a categorized as a new store query, Charlotte, N.C., Southeast, requesting general information. Post 308 includes content 300 "Do you carry low E strings, or do they only come in the packs?" and may be classified as a product/inventory query, guitar, requesting general information. Similar to post 304, the automated queue may utilize the customer data to identify a location to include in the content category. Post 310 includes content 303 "Waited 45 minutes to get a cable, go somewhere else." and may be categorized as service complaint. The automated queue may identify and include in the content category a location based on customer data, such as purchase history and may determine the need to answer on a public matter or open a conversation on a private matter. Public replies or private conversations may depend on whether the information request needs to exchange delicate information that should not be disclosed in public, such as based on keywords in the content.

In some examples, content 303 of a post, such as post 312, may include slang, abbreviations, text message truncations, misspellings, or the like. The content 303 of post 312 may be interpreted by the automated queue based on known or learned post terminology, e.g. texting, lexicography and common misspellings. The automated queue may interpret the content "sup u got crazy stuf @ yo stor, but do u got a fuzz pedel?" to mean "Hello, you have (weird or a lot of) products at your store. Do you have a fuzz pedal?" and may categorize the case as guitar, music department, product/inventory inquiry.

The automated queue may enter the case into a virtual queue for an agent review. The case may be entered in the virtual queue with an interaction type, a content category designation, both, multiple designations, or no characterization, depending of the configuration of the automated queue.

In some example embodiments, the automated queue may receive agent skill data for one or more agents. Agent skill data may include one or more or technical skills, product/service knowledge areas, store or office locations associated with the agent, position in the organization, years of experience, spoken or written languages, or the like. The automated queue may authorize one or more content category designations based on the agent skill data. For example the automated queue may authorize a sales associated in the guitar department of a store in Charlotte, N.C. with for content category designations including guitars, music department, Charlotte store, and general/default. A sales manager for a south east region may be authorized for all store locations in the southeast region, and one or more departments, products or services that the sales manager is associated with.

The automated queue may receive agent availability data from one or more computing devices. The agent availability data may be generated in response to an idle agent logging into the automated queue to review and respond to cases. Additionally or alternatively, the agent availability may be determined by an automated comparison of the number of associates assigned to a particular location and the sales engagement of the location, such as measured by completed sales transactions, number of customers in the store, agent busy status signals from personal data assistant (PDA) or other computing devices, or the like. The automated queue may assign one or more cases in the queue to one or more agents based on the content category designations, agent skill data, customer customization, and/or agent availability.

In some example embodiments, the automated queue may assign one case at a time to an agent logged into the automated queue based on a match of the content category designation and at least one of the authorized content category designations. By assigning the cases one at a time, the agent may respond to cases during an idle period, but return to local sales, if necessary, without removing additional cases from the automated queue, which may not be responded to promptly.

In an example embodiment, the automated queue may be configured to send one or more cases to an agent based on the agent availability data indicating that one or more agents at a location are idle. The cases may be sent to a PDA or other computing device associated with the agent as a text message, email, or the like with a hyperlink to the case. The automated queue may also assign the cases based on which of the available associates at the particular location is authorized for the content category designations associated with the case or cases.

Figure 4:
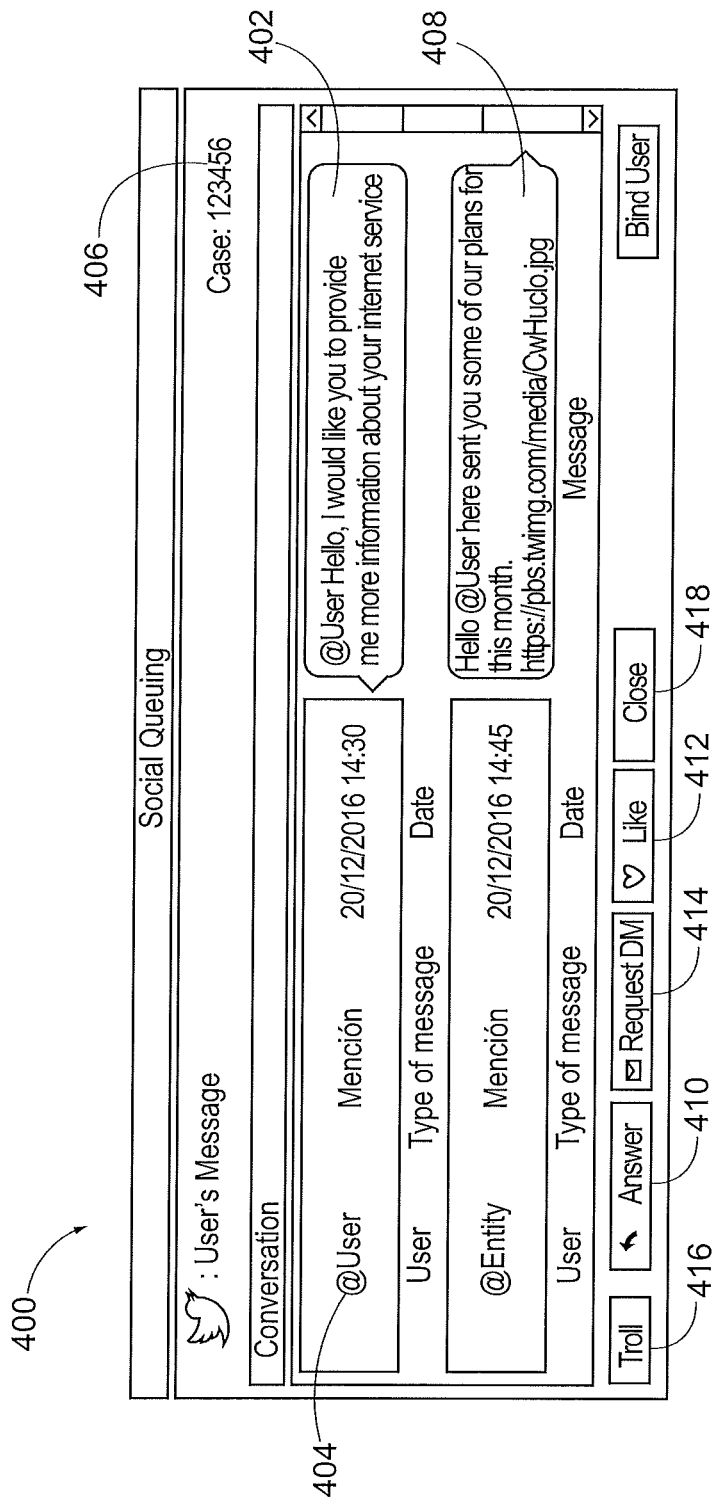
FIG. 4 illustrates an example social media interface including a response template according to an example embodiment.

The automated queue may be configured to cause the content 402 of the post to be displayed to the agent on a user interface. The user interface may display the content in a graphic user interface 400, depicted in FIG. 4, which may include the content 402, a case code 406, e.g. post tracking number, customer data 404, or the like. The agent may utilize the graphic user interface to enter a response in a response field 408. In some example embodiments, the automated queue may include one or more response templates for responding to one or more content types, which may be responded to multiple times. The automated queue may cause one or more response templates to be displayed. The response templated may be automatically displayed based on the content category designation, the type of interaction, or the like. In some example embodiments, the agent may request or open the response templates in response to reading the content 402.

Figure 5:
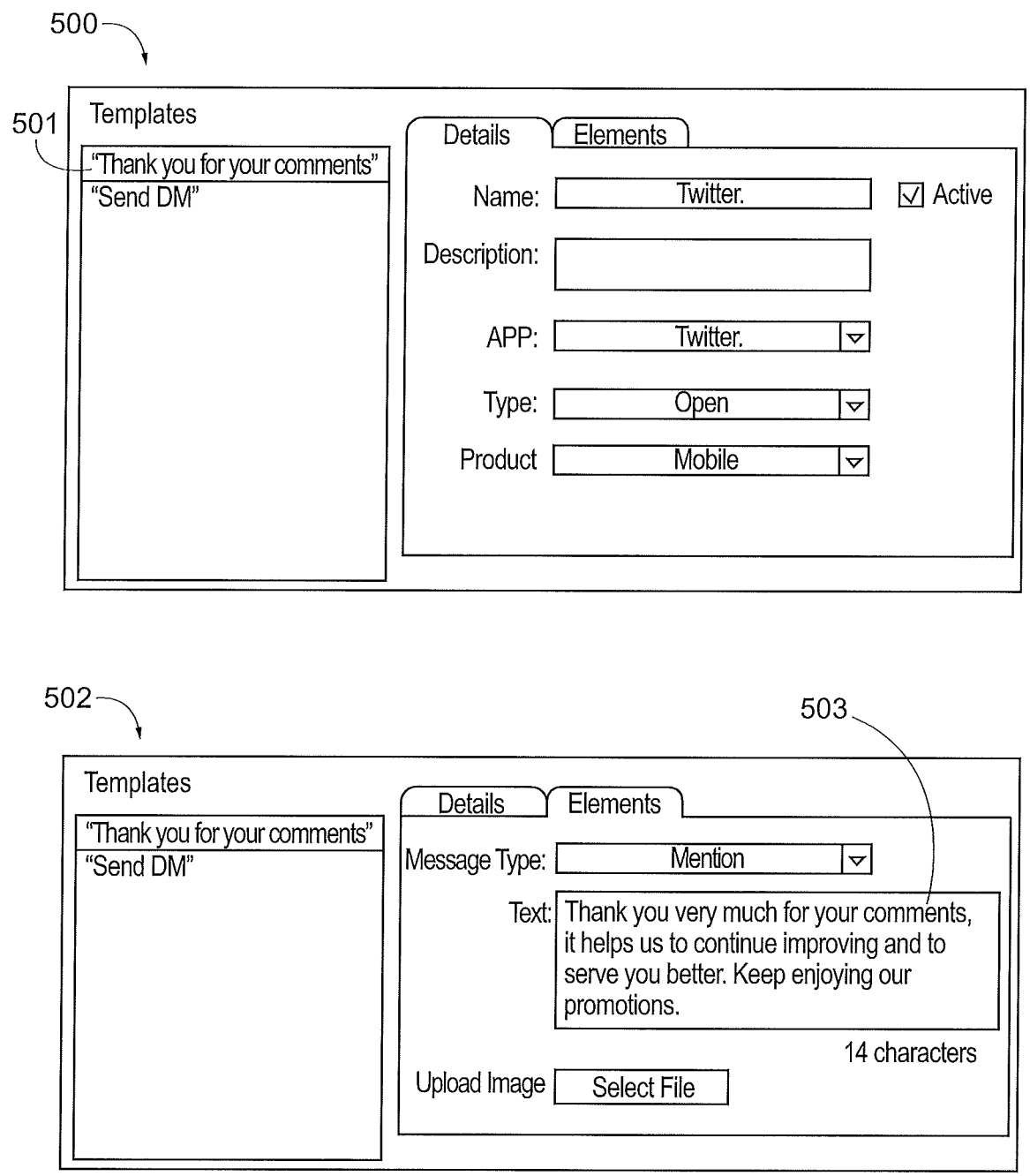
FIG. 5 illustrates an example social media interface including an agent response according to an example embodiment.

In some instances, the automated queue may include a response template bank including a plurality of templates generated by agents and/or administrators, which may expedite responses to posts associated with a general information request. The response bank may include an index or filter interface 500, as depicted in FIG. 5. The agent may select one or more fields to locate an appropriate template, such as name of the social media platform, keyword description, case type, product/service or the like. One or more template titles may be displayed in a template selection menu 501. The template titles may be named to indicate the subject matter appropriate for the response template. The template bank may also enable a response template preview 502, which may be manually selected by the agent or automatically open in response to selection of a response template. The response template preview 502 may include the response content 503, e.g. text, images or other content of the response template. The agent may select a response template for the case, which may populate the response field 408.

In an example embodiment, the agent may edit the response in the response field 408 and select post or "answer" 410 to cause the response to be posted to the social media platform 30. Additionally, or alternatively, the agent may "like" or otherwise acknowledge the post by selecting "like" 412. In an embodiment in which the social media platform 30 includes other acknowledgements, such as wow, angry, love, or the like, the graphic user interface 400 may include a selection for each. The response may include the acknowledgement selection alone or in combination with the text response, which may be advantageous for posts associated with a general information request.

In some example embodiments, an agent may determine the need to open a conversation with a customer in a private way, for example, if the content includes complaints or is requesting services that involve an exchange of private information. The agent may select the direct message 414 to change the destination of the response from the public post location, to the private message inbox associated with the user's identity data.

In an example embodiment, the agent may indicate that the content is indicative of a troll post, by selecting troll 416. For example, post 316 includes content "Reps at Johns are no talent hacks go to Jimmy's if you need good stuff" In an example embodiment, the automated queue may cause the post to be reviewed by an administrator, such as a store manager by changing the content category designation to troll or other indicator, which may cause the automated queue to reassign the case to the administrator. In some embodiments, the agent and/or administrator may respond to the case in addition to marking the case as a troll post, which may allow a polite response, such "thank you for your comment." In some example embodiments, the automated queue may be configured to cause a user identity associated with the case or customer data to be blocked from public posting. For example, the automated queue may block the user from posting on the public account, e.g. wall, timeline, or the like, associated with the target entity. In some cases, such as profanity or inappropriate content, automated queue may send a block request to the social media platform including the content and the user identity data requesting that the user be blocked from the social media platform 30. The block request may be initiated by an agent, such as the administrator, or initiated automatically in response to profanity or other predetermined terms in the content.

In some example embodiments, the agent may determine that the content category is incorrect and enter a change to the content category designation. Changing the content category may be useful for machine learning discussed above and/or to enable the case to be assigned to an agent with the changed authorized content categories. If the agent is authorized to generate a response for the changed content category designation, the agent may generate the response as discussed above. If the agent is not authorized to generate a response for the changed content category designation, the automated queue may enter the case back into the virtual queue for reassignment based on the changed content category designation.

In an example embodiment, the automated queue may update the customer data based on the response posted to the social media platform. The agent may indicate that the case is resolved, such as by selecting "close" 418. A resolved case may be a case in which the agent determines that the response is sufficient to answer any issues raised by the content and a reply is not expected, or that any expected reply will not necessitate a further response. In an embodiment, the inventive system tracks which agents respond to which posts, such that quality control can be monitored. In this embodiment, resolved cases may be indexed according to the agent that closed them. The system may allow an administrator to search the index and review resolved cases on an agent-by-agent basis.

In some example embodiments, the automated queue may be configured to receive one or more replies to a response posted to the social media platform. The replies may be for open cases in which content from the reply is added to the case and the entered into the virtual queue for response. Additionally or alternatively, the replies may be for closed cases. The reply may reopen the case and be processed, as discussed above, or may generate a new case. The new case may include the content of the post, the response and the customer data associated with the original case, and may be processed, as discussed above.

In an example embodiment, the automated queue may be configured to determine if the content includes one or more keywords. The keyword determination may be performed at any point in the process, such as prior to assignment to an agent. The keywords may be indicative of a predetermined action, such as a real time appointment, or may be indicative of content for which prioritized response would be desirable, for example content indicative of a service complaint and location data indicating the customer is at a target entity location, e.g. store, restaurant, office, or the like.

In an embodiment in which the automated queue is configured to search for keywords for a prioritized response, the automated queue may search content for negative terms, such as never, bad, awful, or the like indicative of negative content. Additionally, the automated queue may search the content for location data such as a location indicative of the user being at a target entity location. The automated queue may advance the case to the front of the queue in response to one or more keywords, and/or location data indicating the user is at a target entity location. In some embodiments, the automated queue may search for predetermined content, such as "birthday," "celebrate," or other terms associated with a festive gathering. The agent may be able to coordinate sending a birthday greeting to the user or a free desert, in response to the keyword prioritization, or offer ameliorative services to a complaining user, which may strengthen or repair customer relations. These search keywords are merely examples and one of ordinary skill in the art would immediate appreciate that other terms and/or term categories may be used based on the target entity.

In an embodiment in which the automated queue is configured to search for key words to trigger a predetermined action, the automated queue may search content for terms such as "agent," appointment," "meeting," "ticket," or the like. In response to determining the presence of a predetermined keyword, the automated queue may be configured to cause an agent slot request to be transmitted to the user, e.g. emailed, private messaged, texted, or the like, based on the customer data. The agent slot request may include the name of the user, one or more time slots available, and/or time ranges. In some embodiments, the agent slot time request may include an in-person or online option, and a location field if in-person is selected.

The automated queue may receive a response to the agent slot time request indicating acceptance of one or more available agent times and/or an indication of in person location or online. The automated queue may schedule an agent for the agent slot time based on the indication of acceptance. The automated queue may also transmit an agent slot time ticket to the user based on the customer data. The agent slot time ticket may be used for pre-queuing at an in-person location or as proof of scheduled appointment with the agent. In an example embodiment, the agent slot time ticket may be an alphanumeric code, barcode, QR code, or the like.

In an example embodiment, the keyword may trigger a specific action template 700, as depicted in FIG. 7. The specific action template 700 may include response content 702 for the specific action, which may be specific to the social media platform by a media selector 704. The specific response template 700 may also include agent slot time options 706 or other options associated with other specific trigger actions. In an example embodiment, the specific response template 700 may also include confirmation text 708. The confirmation text may include one or more fields populated by a user reply to the response, such as the time associated with a selected agent time slot option 706 and a ticket number. In an example embodiment, the confirm action text may populate and transmit automatically in response to the reply from the user.

In an example embodiment, the automated queue may be configured to interact with a queue kiosk at one or more locations for the particular target entity. In some example embodiments, automated queue may also process a virtual queue for one or more locations, as discussed in further detail in Patent Applications filed Jul. 31, 2017 entitled "Queue Management System Utilizing Virtual Service Providers" and Patent Application filed Jul. 31, 2017 entitled "Automated Queuing System," which are incorporated herein in their entirety.

Figure 12A:
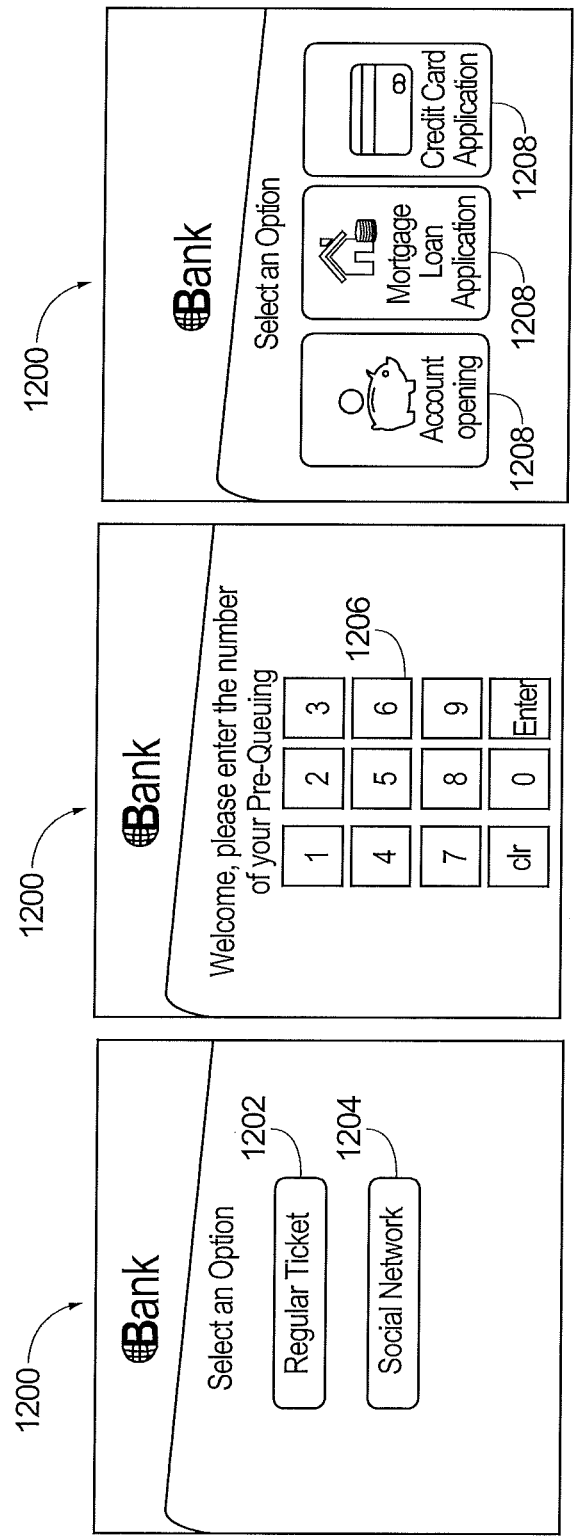
FIGS. 12A and 12B illustrate example queue interface displays according to an example embodiment.
Figure 12B:
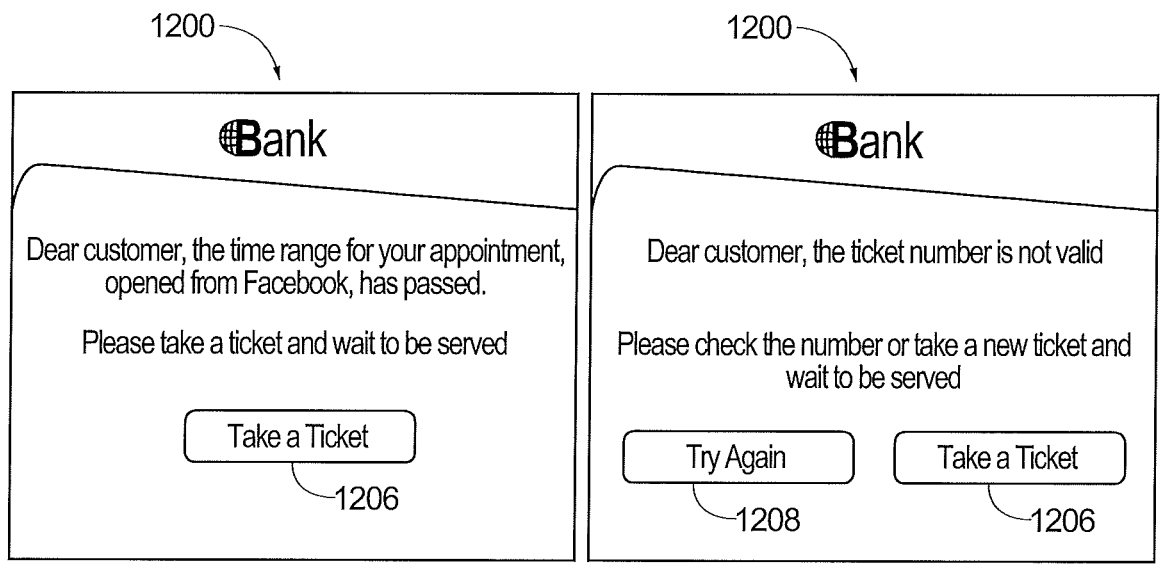

The kiosk may present users with a queue interface 1200, as depicted in FIGS. 12A-12B, including a normal ticket option in which users may be added to the virtual queue in the order in which they interact with a kiosk or a social network ticket 1204. In response to selecting the social media ticket 1204, the queue interface 1200 may request confirmation of an agent slot time ticket. The queue interface 1200 may display a number pad 1206 to receive a ticket number, or may include an alpha numeric keyboard, a code scanner or the like configured to receive an alphanumeric code, barcode, QR code, or the like. In response to an accepted agent slot time ticket, the queue interface 1200 may display one or more service selection options 1208, which may enable the agent to be better prepared to assist the user. The user may be entered into the front of the local virtual queue and/or the automated queue may cause an alert to be sent to the agent scheduled for the agent time slot, such as a text, and email, a voice message, or the like, to notify the agent that the user has arrived.

In response to the agent slot time being expired the queue interface 1200 may display a normal ticket request 1210. In response to an invalid agent slot time ticket, the queue interface 1300 may display option to reenter the agent slot time ticket 1212 or to take a normal ticket 1214.

The example target entities discussed herein are merely for illustrative purposes, and one of ordinary skill in the art would immediately appreciate that the automated queue may be utilized by any entity offering any type or goods and/or services.

Example Method Flowcharts

In some cases, a method of automated queuing according to an example embodiment may be provided. FIGS. 8-11 illustrate block diagrams of some activities that may be associated with one illustrative example of such a method. In some embodiments, the processing circuitry 20 (which may include a processor capable of executing instructions stored in a non-transitory computer readable medium/memory) may be configured to implement a control algorithm for the automated queuing system according to the method.

In an example embodiment, the method may include capturing or receiving posts from the one or more social media servers associated with the target entity at operation 804, generating a case including content of a post at operation 806, entering the case in a virtual queue for agent review at operation 814, causing the content of the post to be displayed to the agent at operation 1008, receiving a response from a user interface at operation 1012, and the response to be posted to the social media platform at operation 1014.

In some embodiments, the method may include additional, optional operations, and/or the operations described above may be modified and/or augmented. Some examples of modifications, optional operations, and augmentations are described below, as indicated by dashed lines, such as, searching one or more social media platforms for posts associated with a target entity at operation 802 and determining an interaction type for the case at operation 808. In an example embodiment the method may include determining a content category for the case based on the content at operation 810 and uploading case with content category designation at operation 812. In an example embodiment, the method may include receiving a reply to response at operation 816.

In some example embodiments, the method may include determining user identity data from each post at operation 902, determining if customer data is available for a customer associated with the user identity data at operation 904, updating the customer data based on the user identity at operation 906. In an example embodiment, the method may include associating the customer data with the case at operation 908 and generating customer data based on the user identity data at operation 910. In some example embodiments, the method may include determining if an automatic response is available for the interaction type at operation 912 and generating the automatic response at operation 914.

In some example embodiments, the method may include agent skill data for one or more agents at operation 1002, authorizing one or more content categories for an agent based on the agent skill data at operation 1004, receiving agent availability data at operation 1006, and assigning one or more cases in the queue to one or more agents based on the agent availability data and/or content category at operation 1026. In an example embodiments, the method may also include causing a response template to be displayed based on the content of the case at operation 1010, updating customer data based on the response at operation 1016, and closing the case in response to the response indicating resolution at operation 1018. In some example embodiments, the method may include receiving an indication of change to the content category designation at operation 1020, receiving an indication of troll post at operation 1022, and causing the one or more user identities associated with the customer data to be blocked from public posting at operation 1024.

In an example embodiment, the method may include determining if the content includes a keyword at operation 1102, causing an agent time slot request to be transmitted in response to presence of the keyword in the content at operation 1104, receiving an indication of acceptance of the agent time slot at operation 1106, scheduling an agent for the agent time slot at operation 1108, and transmitting of an agent slot time ticket at operation 1110. In some example embodiments, the method may include advancing the case to the front of the queue in response to presence of the keyword in the content at operation 1112.

In an example embodiment, the automated queue may comprise a processor (e.g. the processor 22) or processing circuitry 20 configured to perform some or each of the operations (802-816, 902-924, 1002-1026, and 1102-1112) described above. The processor 22 may, for example, be configured to perform the operations (802-816, 902-924, 1002-1026, and 1102-1112) by performing hardware implemented logical functions, executing stored instructions, or executing algorithms for performing each of the operations.

In some embodiments, the processor 22 or processing circuitry 20 may be further configured for additional operations or optional modifications to operations 802-816, 902-924, 1002-1026, and 1102-1112. In this regard, in an example embodiment, the processing circuitry is further configured to search one or more social media platforms for posts associated with the target entity. In an example embodiment, the processing circuitry is further configured to determine an interaction type for the case, determine if an automatic response is available for the interaction type, generate an automatic response, in response to an automatic response being available, cause the automatic response to be posted to the social media platform. In some example embodiments, the processing circuitry is further configured to determine a content category based on the content and update the case with a content category designation. In an example embodiment, the processing circuitry is further configured to receive agent skill set data for one or more agents, authorize one or more content categories for the one or more agents based on the agent skill set data, receive agent availability data for the one or more agents, and assign one or more cases in the virtual queue to the one or more agents based on the content categories assigned to the agent, the content category designation, and the agent availability data. In some example embodiments, the processing circuitry is further configured to receive an indication of a change to the content category designation in response to displaying the content on the user interface. In an example embodiment, the processing circuitry is further configured to receive agent availability data for one or more agents and assign one or more cases in the virtual queue to an agent based on the agent availability data. In some example embodiments, the processing circuitry is further configured to cause a response template to be displayed based on the content of the case. In an example embodiment, the processing circuitry is further configured to receive a reply to a response on the social media platform and generate a second case including the content of the post and the reply. In some example embodiments, the processing circuitry is further configured to receive an indication that the content is a troll post and cause one or more user identities associated with the troll post to be blocked on the social media platform. In an example embodiment, the processing circuitry is further configured to determine user identity data from the one or more posts, receive customer data associated with the user identity data, and associated the customer data with the case. In some example embodiments, the processing circuitry is further configured to determine if customer data is available for a customer associated with the user identity and generate customer data based on the user identity in response to no customer data being available. In an example embodiment, the processing circuitry is further configured to update the customer data based on the user identity data or the content. In some example embodiments, the processing circuitry is further configured to update the customer data based on the response. In an example embodiment, the processing circuitry is further configured to close the case in response to the response indicating resolution. In some example embodiments, the processing circuitry is further configured to determine if the content includes a keyword and advance the case in the queue in response to the presence of the keyword. In an example embodiment, the processing circuitry is further configured to determine if the content includes a keyword and cause an agent time slot request to be transmitted in response to the presence of the keyword. In some example embodiments, the processing circuitry is further configured to receive an indication of acceptance of the agent time slot and schedule an agent for the agent time slot. In an example embodiment, the post is public. In some example embodiments, the post is a private message.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. An automated queuing system comprising
    a plurality of service provider computing devices located in at least two different service provider facilities;
    at least one customer input device;
    at least one customer communication device located in the first service provider facility, wherein the customer communication device is configured to facilitate communication between a service provider located in a second service provider facility and a customer located in the first service provider facility; and
    a server comprising a processing circuitry coupled to a memory and configured to execute computer-readable instructions stored in the memory, wherein the computer-readable instructions, when executed, cause the processing circuitry to:
        receive information for a plurality of service providers from the plurality of service provider computing devices, wherein the information comprises availability information as to whether the service providers are each idle or busy and skill information as to which services the services providers are qualified to provide from among a plurality of services offered;

generate a plurality of virtual queues, wherein the number of queues created correlates to the plurality of services offered;

search one or more social media platforms for posts associated with a target entity associated with the service provider;

receive one or more posts from a social media platform;

respond to the one or more posts by prompting a user to select from a of plurality of services offered;

receive a customer service request from the user;

assign the user at least one virtual queue position and at least one customer service provider based at least in part on the availability information and the skill information associated with the plurality of service providers; and in response to the user reaching the front of the virtual queue:

notify the user of the assignment, wherein if the assigned customer service provider is located in the second service provider facility, the customer is assigned to a customer communication device located in the first service provider facility for service of the request by a customer service provider located in the second service provider facility;

receive an indication of service completion from a service provider device;

advance the virtual queue based on the indication of service completion; and cause a response to be posted to the social media platform, wherein the processing circuitry is configured to receive all information from the user without requiring the user to depart from the social media platform, wherein the computer-readable instructions, when executed, cause the processing circuitry to determine the virtual queue that the customer should be assigned, wherein at least one virtual queue for an in-person service provider in the first service provider facility and at least one virtual queue for a remote service provider in the second service provider facility are considered when determining the virtual queue that the customer should be assigned to.

2. The automated queuing system of claim 1, wherein the processing circuitry is further configured to:
determine an interaction type for the one or more posts;
determine if an automatic response is available for the interaction type;
generate an automatic response, in response to an automatic response being available; and
cause the automatic response to be posted to the social media platform.

3. The automated queuing system of claim 1, wherein the processing circuitry is further configured to:
determine a content category based on the content of the one or more posts; and
use the content category designation to prompt a user to select from a of plurality of services offered.

4. The automated queuing system of claim 3, wherein the processing circuitry is further configured to:
receive an indication of a change to the content category designation in response to displaying the content on the user interface.

5. The automated queuing system of claim 1, wherein the customer input device and the customer communication device comprise the same device.

6. The automated queuing system of claim 1, wherein the processing circuitry is further configured to:
receive an indication that the content of the one or more posts is a troll post;
determine one or more user identities associated with the troll post; and
notify the social media platform of one or more of the user identities associated with the troll post.

7. The automated queuing system of claim 1, wherein the processing circuitry is further configured to:
determine user identity data from the one or more posts;
receive customer data associated with the user identity data; and
associate the customer data with the customer service request.

8. The automated queuing system of claim 7, wherein the processing circuitry is further configured to:
determine if customer data is available for a customer associated with the user identity; and
generate customer data based on the user identity in response to no customer data being available.

9. The automated queuing system of claim 7, wherein the processing circuitry is further configured to:
update the customer data based on the user identity data or the content of the one or more posts.

10. The automated queuing system of claim 1, wherein the processing circuitry is further configured to:
determine if the content of the one or more posts includes a keyword; and
assign the customer service request a priority position in the queue in response to the presence of the keyword.

11. The automated queuing system of claim 1, wherein the processing circuitry is further configured to:
prompt a user to select from immediate service or a time slot service.

12. The automated queuing system of claim 11, wherein the processing circuitry is further configured to:
receive an indication of acceptance of the time slot service; and
schedule a service provider for the time slot.

13. The automated queuing system of claim 1, wherein the one or more posts is public.

14. The automated queuing system of claim 1, wherein the one or more posts is a private message.

15. The automated queuing system of claim 1, wherein the processing circuitry is further configured to:
collect service provider historical data for the plurality of service providers, wherein the historical data comprises upsell success or customer service rating;
generate a historical data report for at least one service provider of the plurality of service providers; and
transmit the historical data report to at least the first service provider facility.

16. An automated queuing system comprising:
a plurality of service provider computing devices located in at least two different service provider facilities;
at least one customer input device;
at least one customer communication device located in the first service provider facility, wherein the customer communication device is configured to facilitate communication between a service provider located in a second service provider facility and a customer located in the first service provider facility; and a server comprising a processing circuitry coupled to a memory and configured to execute computer-readable instructions stored in the memory, wherein the computer-readable instructions, when executed, cause the processing circuitry to:

receive information for a plurality of service providers from the plurality of service provider computing devices, wherein the information comprises availability information as to whether the service providers are each idle or busy and skill information as to which services the services providers are qualified to provide from among a plurality of services offered;

generate a plurality of virtual queues, wherein the number of queues created correlates to the plurality of services offered;

search one or more social media platforms for posts associated with a target entity associated with the service provider;

receive one or more posts from a social media platform;

respond to the one or more posts by determining a desired service based upon the content of the one or more posts and prompting a user to accept a proposed customer service request;

receive confirmation of the customer service request from the user;

assign the user at least one virtual queue position and at least one customer service provider based at least in part on the availability information and the skill information associated with the plurality of service providers; and in response to the user reaching the front of the virtual queue:

notify the user of the assignment, wherein if the assigned customer service provider is located in the second service provider facility, the customer is assigned to a customer communication device located in the first service provider facility for service of the request by a customer service provider located in the second service provider facility;

receive an indication of service completion from a service provider device;

advance the virtual queue based on the indication of service completion; and cause a response to be posted to the social media platform, wherein the processing circuitry is configured to receive all information from the user without requiring the user to depart from the social media platform, wherein the computer-readable instructions, when executed, cause the processing circuitry to determine the virtual queue that the customer should be assigned, wherein at least one virtual queue for an in-person service provider in the first service provider facility and at least one virtual queue for a remote service provider in the second service provider facility are considered when determining the virtual queue that the customer should be assigned to.

17. The automated queuing system of claim 16, wherein the processing circuitry is further configured to:

prompt a user to select from immediate service or a time slot service.

18. The automated queuing system of claim 16, wherein the processing circuitry is further configured to:

determine an interaction type for the one or more posts;

determine if an automatic response to the one or more posts is available for the interaction type;

generate an automatic response, in response to an automatic response being available; and cause the automatic response to be posted to the social media platform.

19. The automated queuing system of claim 16, wherein the processing circuitry is further configured to:

determine if the content of the one or more posts includes a keyword; and assign the customer service request a priority position in the queue in response to the presence of the keyword.

20. The automated queuing system of claim 16, wherein the processing circuitry is further configured to:

collect service provider historical data for the plurality of service providers, wherein the historical data comprises upsell success or customer service rating;

generate a historical data report for at least one service provider of the plurality of service providers; and transmit the historical data report to at least the first service provider facility.

* * * * *